(12) United States Patent
Ebihara et al.

(10) Patent No.: US 9,797,485 B2
(45) Date of Patent: Oct. 24, 2017

(54) BELT TYPE CONTINUOUSLY VARIABLE TRANSMISSION DEVICE

(71) Applicant: KANZAKI KOKYUKOKI MFG. CO., LTD., Amagasaki (JP)

(72) Inventors: Tomoyuki Ebihara, Amagasaki (JP); Tatsuya Kamada, Amagasaki (JP); Michio Tsukamoto, Amagasaki (JP); Koji Iwaki, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 0 days.

(21) Appl. No.: 15/016,032

(22) Filed: Feb. 4, 2016

(65) Prior Publication Data
US 2016/0186841 A1 Jun. 30, 2016

Related U.S. Application Data

(62) Division of application No. 14/323,523, filed on Jul. 3, 2014, now abandoned.

(30) Foreign Application Priority Data

Jul. 5, 2013 (JP) .................................. 2013-141398
Jul. 5, 2013 (JP) .................................. 2013-141399

(51) Int. Cl.
F16H 55/56 (2006.01)
F16H 59/00 (2006.01)
(Continued)

(52) U.S. Cl.
CPC .............. *F16H 9/18* (2013.01); *F16H 55/56* (2013.01); *F16H 63/062* (2013.01)

(58) Field of Classification Search
CPC .......... F16H 63/062; F16H 55/56; F16H 9/18; F16H 61/66259; F16H 61/66272
(Continued)

(56) References Cited

U.S. PATENT DOCUMENTS 4,973,288 A * 11/1990 Sakakibara ......... F16H 37/0846
474/12
5,094,652 A * 3/1992 Sakakibara ........... F16H 37/022
474/46
(Continued)

FOREIGN PATENT DOCUMENTS

| EP | 2028351 A2 | 2/2009 |
| JP | 2006029504 | 2/2006 |
| JP | 2007-008405 | 1/2007 |

OTHER PUBLICATIONS

Extended European Search Report issued for EP Appl. No. 14175377.2 dated Jan. 19, 2015.

*Primary Examiner* — Henry Liu
(74) *Attorney, Agent, or Firm* — Dorsey & Whitney LLP

(57) ABSTRACT

A belt type continuously variable transmission device includes an actuator that moves a moveable sheave member of a drive pulley which is a one-side pulley in an axial direction. The actuator includes a moveable feed member, a gear case, and an electric motor. The moveable feed member includes an inner tube section in which a moveable-side feed screw is provided, an outer tube section in which an outer gear is provided, and a lid section. The gear case has a fixed tube section in which a fixed-side feed screw is provided, and an outer cover. The electric motor drives a motor-side gear that intermeshes with the outer gear. The outer cover has an opening into which the outer tube section is inserted and that proximately opposes an outer circumferential surface of the outer tube section.

8 Claims, 26 Drawing Sheets

(51) Int. Cl.
*F16H 61/00* (2006.01)
*F16H 63/00* (2006.01)
*F16H 9/18* (2006.01)
*F16H 63/06* (2006.01)

(58) Field of Classification Search
USPC .................................................. 474/8, 18
See application file for complete search history.

(56) References Cited

U.S. PATENT DOCUMENTS

| | | | | |
|---|---|---|---|---|
| 5,378,198 | A * | 1/1995 | Moroto | F16H 63/062 474/30 |
| 6,120,399 | A * | 9/2000 | Okeson | F16H 55/56 474/12 |
| 6,171,207 | B1 * | 1/2001 | Ehrlich | F16H 55/56 474/18 |
| 6,270,436 | B1 * | 8/2001 | Reik | F16H 9/14 474/15 |
| 6,342,024 | B1 * | 1/2002 | Walter | F16H 37/021 474/28 |
| 6,669,589 | B2 * | 12/2003 | Onogi | F16H 63/062 474/23 |
| 6,743,129 | B1 * | 6/2004 | Younggren | F16H 55/56 474/17 |
| 6,764,421 | B2 * | 7/2004 | Onogi | F16H 55/56 474/46 |
| 6,902,502 | B2 * | 6/2005 | Murakami | F16H 7/08 474/23 |
| 6,997,832 | B2 * | 2/2006 | Onogi | F16H 55/56 474/46 |
| 7,361,108 | B2 * | 4/2008 | Haas | F16H 9/18 474/20 |
| 7,674,197 | B2 * | 3/2010 | Aitcin | F16H 55/56 474/10 |
| 7,794,344 | B2 * | 9/2010 | Ishioka | F16H 61/66259 474/28 |
| 7,927,241 | B2 * | 4/2011 | Labbe | F16H 55/56 474/10 |
| 8,133,141 | B2 * | 3/2012 | Kremer | F16H 61/66272 474/18 |
| 8,371,972 | B2 * | 2/2013 | Sugitani | F16H 9/18 474/43 |
| 8,534,413 | B2 * | 9/2013 | Nelson | B60W 50/082 180/366 |
| 2002/0115510 | A1 * | 8/2002 | Onogi | F16H 61/66272 474/69 |
| 2002/0183146 | A1 * | 12/2002 | Yoshida | F16H 25/2214 474/23 |
| 2004/0204271 | A1 * | 10/2004 | Otaki | F16H 25/2204 474/8 |
| 2004/0235596 | A1 * | 11/2004 | Otaki | F16H 55/56 474/8 |
| 2005/0239585 | A1 * | 10/2005 | Nishida | F16H 55/56 474/19 |
| 2006/0040773 | A1 * | 2/2006 | Mizon | B60K 17/34 474/18 |
| 2007/0026982 | A1 * | 2/2007 | Aoyama | F16H 9/18 474/14 |
| 2007/0054765 | A1 * | 3/2007 | Mochizuki | F16H 9/18 474/18 |
| 2007/0155552 | A1 * | 7/2007 | De Cloe | B60K 25/02 474/23 |
| 2007/0197321 | A1 * | 8/2007 | Ishioka | F16H 61/66259 474/28 |
| 2008/0015065 | A1 * | 1/2008 | Kato | B60K 17/34 474/8 |
| 2009/0176607 | A1 * | 7/2009 | Muller | F16H 55/56 474/18 |
| 2009/0270208 | A1 * | 10/2009 | Starkey | F16H 63/062 474/11 |
| 2011/0143872 | A1 * | 6/2011 | Chen | F16H 55/56 474/23 |
| 2011/0152019 | A1 * | 6/2011 | Gantner | F16H 9/24 474/8 |
| 2011/0152020 | A1 * | 6/2011 | Brind'Amour | F16H 55/56 474/8 |
| 2012/0055728 | A1 * | 3/2012 | Bessho | B60K 5/04 180/292 |
| 2012/0100944 | A1 * | 4/2012 | Gu | F16H 9/18 474/46 |
| 2012/0101944 | A1 | 4/2012 | Gu | |
| 2012/0328454 | A1 * | 12/2012 | Roby | F01P 7/048 417/319 |
| 2013/0092468 | A1 * | 4/2013 | Nelson | B60W 50/082 180/366 |
| 2015/0011344 | A1 * | 1/2015 | Ebihara | F16H 9/18 474/8 |

* cited by examiner

BELT TYPE CONTINUOUSLY VARIABLE TRANSMISSION DEVICE

CROSS-REFERENCE TO RELATED APPLICATION(S)

This application is a divisional application of pending U.S. application Ser. No. 14/323,523 filed Jul. 3, 2014, which claims priority to Japanese Patent Application Nos. 2013-141398 and 2013-141399, both filed on Jul. 5, 2013. The specification, claims, drawings, and abstract, are incorporated herein by reference in their entirety, for any purpose.

BACKGROUND

1. Technical Field

The present invention relates to a belt type continuously variable transmission device having a moveable sheave member that pinches a belt between the moveable sheave member and a fixed sheave, and an actuator that moves the moveable sheave member in an axial direction.

2. Related Art

In the related art, a structure is known in which a belt type continuously variable transmission device is incorporated in a motive power transmitting mechanism that transmits motive power of a motive power source of a vehicle to a wheel. In the belt type continuously variable transmission device, a belt is bridged between a drive pulley on the side of the motive power source in the motive power transmission direction and a driven pulley on the side of the wheel. Of the drive pulley and the driven pulley, at least one pulley includes a fixed sheave, and a moveable sheave which can be moved in an axial direction with respect to the fixed sheave. As the belt type continuously variable transmission device, an electrically-driven structure is known in which the moveable sheave is moved in the axial direction by an actuator including an electric motor.

JP 2007-8405 A and JP 2006-29504 A disclose a belt type continuously variable transmission device having a structure in which the moveable sheave is moved in the axial direction by a screw-type actuator including an electric motor. The actuator includes a moveable feed screw member supported on the moveable sheave via a tube member and a bearing, and a fixed-side feed screw member which is locked and fixed on a crank case or a transmission casing and screw-engages the moveable feed screw member. In this structure, by the driving of the electric motor, a motor-side gear supported on the crank case or the transmission casing is rotated, and a gear that intermeshes with the motor-side gear and integral with the moveable feed screw member is rotated and thus moved in the axial direction. In addition, US Patent Publication No. 2013/0092468 discloses a clutch CVT (continuously variable transmission) device on the side of the motive power source.

In the structure described in JP 2007-8405 A, with the driving of the electric motor, the motor-side gear is rotated, and the motive power is transmitted to the gear on the other side so that the moveable sheave is moved toward or away from the fixed sheave and a belt roll diameter is changed. However, because the gear which intermeshes with the motor-side gear is exposed to the outside in a state before the belt type continuously variable transmission device is placed in a gearbox case that stores the pulley, an improvement is desired from the viewpoint of improving the endurance of the gear.

Further, in the structure described in JP 2007-8405 A, because a rotational shaft, the pulley, and the actuator cannot be integrally handled in a compact structure in a state before the belt type continuously variable transmission device is placed in the gearbox case, an improvement is also desired from the viewpoint of facilitating the assembly work.

In addition, in the structure described in JP 2007-8405 A and JP 2006-29504 A, the moveable feed screw member is supported via the bearing on the tube member fixed on the moveable sheave, and the screw portion of the moveable feed screw member is provided on an outer circumferential side of the bearing. Because of this, a diameter of the screw portion becomes large. In this case, improvement is desired from the view point of reduction in the size of the feed screw mechanism.

At least one advantage of the present invention is in the provision of a belt type continuously variable transmission device which can improve endurance of a gear in a structure which transmits a rotational force from an electric motor to a member having a feed screw.

At least one advantage of the present invention is in the provision of a belt type continuously variable transmission device which can facilitate the assembly work while not reducing the endurance of the gear.

At least one advantage of the present invention is in the provision of a belt type continuously variable transmission device which can reduce the size of a feed screw mechanism.

SUMMARY

According to a first aspect of the present invention, there is provided a belt type continuously variable transmission device comprising a one-side pulley, an other-side pulley, a belt wound around the one-side pulley and the other-side pulley, and an actuator, the one-side pulley including a moveable sheave member placed to be moveable relatively in an axial direction with respect to a fixed sheave fixed on a rotational shaft and that pinches the belt between the moveable sheave member and the fixed sheave, and the actuator moving the moveable sheave member in the axial direction, wherein the actuator comprises a moveable feed member having an inner tube section supported to be rotatable around a center of the rotational shaft on a radially outer side of the moveable sheave member and in which a moveable-side feed screw is provided, an outer tube section placed on a radially outer side of the inner tube section and in which an outer gear is provided on a radially outer side, and a lid section that connects the inner tube section and the outer tube section, a gear case having a fixed tube section in which a fixed-side feed screw that screw-engages the moveable-side feed screw is provided, and an outer cover integrally provided on the fixed tube section, in which an opening into which the outer tube section is inserted is formed, and that houses the outer gear, and an electric motor that drives a motor-side gear that intermeshes with the outer gear, and the opening proximately opposes an outer circumferential surface on the side of the one-side pulley in relation to the outer gear on the outer tube section, in relation to the axial direction of the rotational shaft.

According to a second aspect of the present invention, there is provided a belt type continuously variable transmission device comprising a one-side pulley, an other-side pulley, a belt wound around the one-side pulley and the other-side pulley, and an actuator, the one-side pulley including a moveable sheave member placed to be moveable relatively in an axial direction with respect to a fixed sheave fixed on a rotational shaft and that pinches the belt between the moveable sheave member and the fixed sheave, and the actuator moving the moveable sheave member in the axial direction, wherein the actuator comprises a moveable feed member having an inner tube section supported to be rotatable around a center of the rotational shaft on a radially outer side of the moveable sheave member and in which a moveable-side feed screw is provided, an outer tube section placed around the inner tube section and in which an outer gear is provided on a radially outer side, and a lid section that connects the inner tube section and the outer tube section, a gear case having a fixed tube section in which a fixed-side feed screw that screw-engages the moveable-side feed screw is provided, and an outer cover integrally provided on the fixed tube section, the gear case being provided in the side of the moveable feed member in relation to the belt in the axial direction of the rotational shaft, and an electric motor having a motor case fixed on the gear case and that drives a motor-side gear that intermeshes with the outer gear, and the outer cover houses the outer gear.

According to a third aspect of the present invention, there is provided a belt type continuously variable transmission device comprising a one-side pulley, an other-side pulley, a belt wound around the one-side pulley and the other-side pulley, and an actuator, the one-side pulley including a moveable sheave member placed to be moveable relatively in an axial direction with respect to a fixed sheave fixed on a rotational shaft and that pinches the belt between the moveable sheave member and the fixed sheave, and the actuator moving the moveable sheave member in the axial direction, wherein the moveable sheave member comprises a moveable tube section provided on a side opposite to a belt engagement surface that engages with the belt, in an axial direction, the actuator comprises a moveable feed screw member which is supported in a manner to be rotatable around a center of a rotational shaft via a bearing on an outer circumferential side of the moveable tube section in a state where movement in the axial direction with respect to the moveable sheave member is blocked, and which has a moveable-side feed screw, an electric motor which rotationally drives the moveable feed screw member, and a case having a fixed-side feed screw which screw-engages the moveable-side feed screw, and at least a part of the moveable-side feed screw is at a position different from the bearing in the axial direction and at the same position as the bearing in a radial direction of the rotational shaft.

DETAILED DESCRIPTION OF PREFERRED EMBODIMENTS

Figure 1:
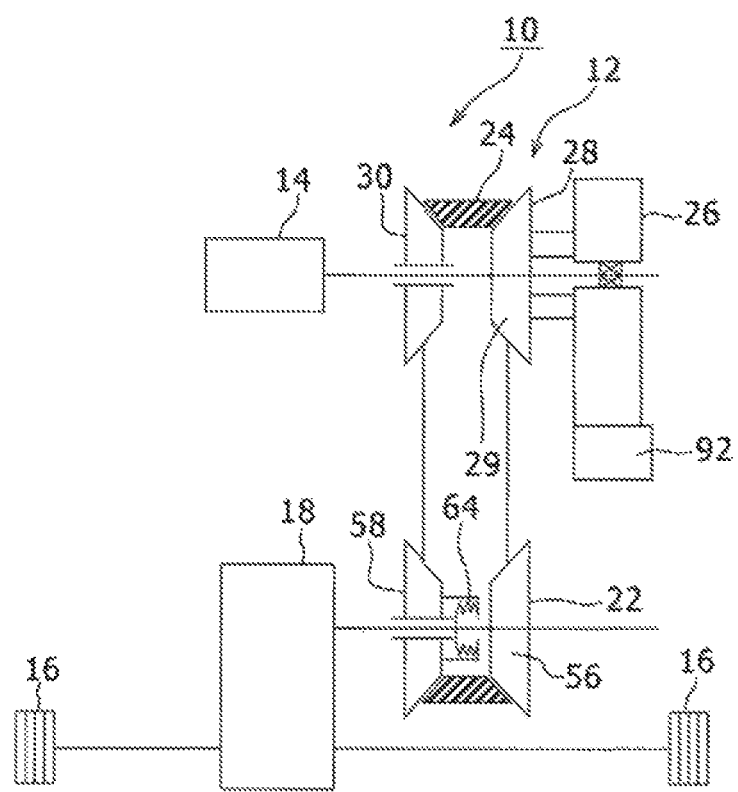
FIG. 1 is a schematic diagram showing a motive power transmitting mechanism for a vehicle which includes a belt type continuously variable transmission device according to an embodiment of the present invention and which transmits motive power from a motive power source to a wheel.

A preferred embodiment of the present invention will now be described with reference to the drawings. In the following, an example configuration will be described in which a motive power transmitting mechanism including a belt type continuously variable transmission device is equipped in a vehicle. In this case, the vehicle may be, for example, a vehicle having a towing member, an off-road vehicle that travels on rough terrain such as wasteland and mountains, a work vehicle having a working member for one or more of snow removal work, excavating work, public work, and farm work, or an off-road type utility vehicle having functions of both an off-road vehicle and a work vehicle. The drive method of the vehicle may be driving of only the front wheels, driving of only the rear wheels, or four-wheel drive. In the following description, similar elements over all of the drawings are assigned the same reference numerals for the description.

FIG. 1 is a schematic diagram showing a motive power transmitting mechanism 10 for a vehicle that includes a belt type continuously variable transmission device 12 according to the present embodiment and that transmits motive power from a motive power source 14 to a wheel 16. The motive power transmitting mechanism 10 for vehicle is provided between the motive power source 14 of the vehicle and the wheel 16 which is either the front wheel or the rear wheel, and is used for transmitting the motive power from the motive power source 14 to the wheel 16. The motive power transmitting mechanism 10 includes the belt type continuously variable transmission device 12 provided between an output shaft of the motive power source 14 and a gear transmission mechanism 18. The gear transmission mechanism 18 includes a differential mechanism (not shown) connected to the left and right wheels 16. The gear transmission mechanism 18 is configured to allow the user to select gear reduction ratios of a plurality of stages by operating a transmission operation member (not shown) provided on the vehicle, and changes a rotational speed ratio between an input shaft on the side of the continuously variable transmission device 12 and an output shaft on the side of the wheel 16. Alternatively, the gear transmission mechanism 18 may be configured to allow the user to select a direction of travel of the vehicle and the gear reduction ratio of the plurality of stages by operating the transmission operation member.

The motive power source 14 is, for example, an engine of an internal combustion engine. Alternatively, an electric motor may be used as the motive power source 14. Alternatively, a hybrid type structure may be employed in which a motive power source 14, an electric motor, and a power generator that is driven by the motive power source 14 and that generates electric power may be equipped on the vehicle, and the vehicle is driven by supplying electric power generated by the power generator directly or via a battery to the electric motor.

Figure 2:
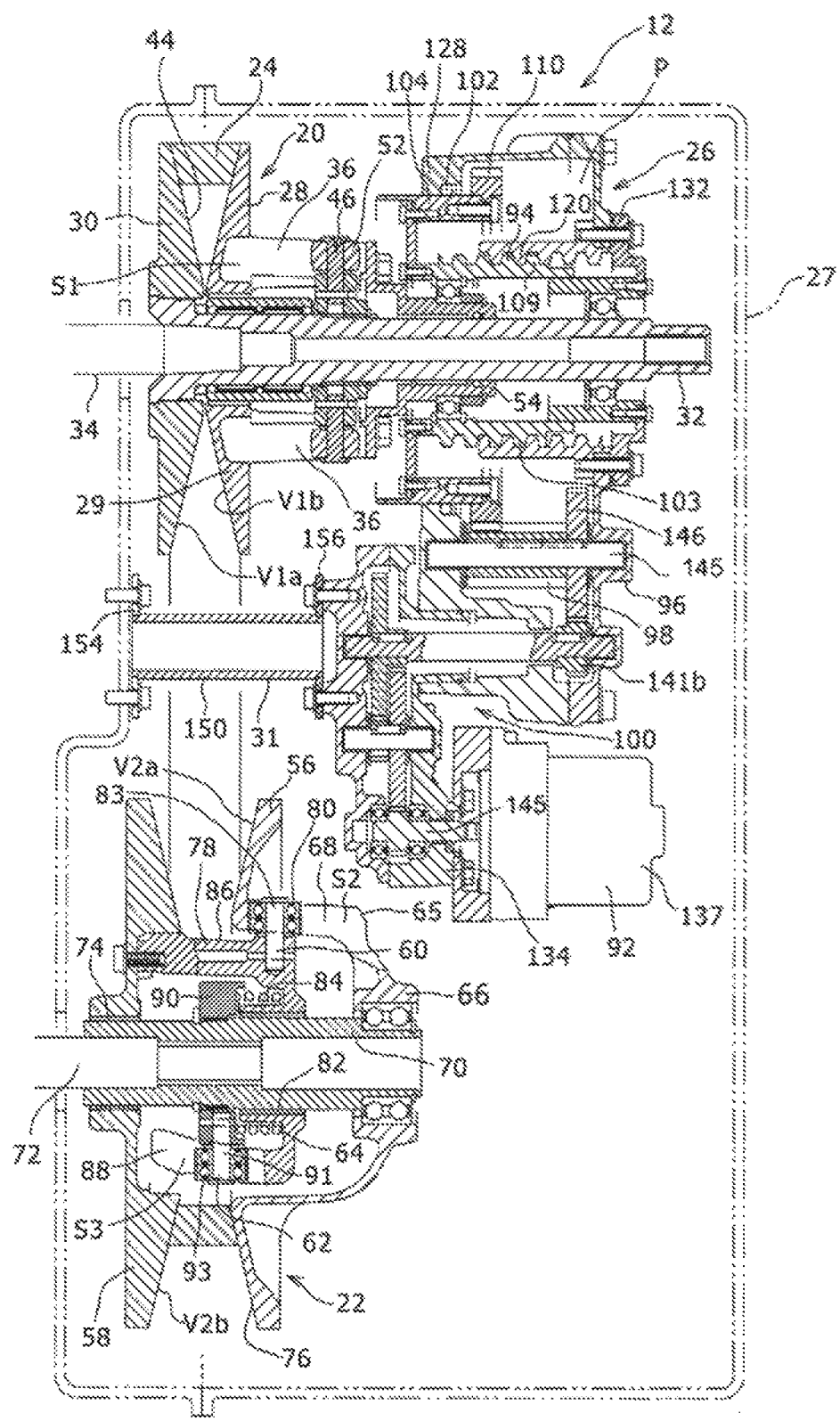
FIG. 2 is a cross sectional diagram showing a maximum gear increase state of the belt type continuously variable transmission device of FIG. 1.

The belt type continuously variable transmission device 12 comprises a drive pulley 20 which is a one-side pulley on the side of the motive power source in relation to the motive power transmitting direction, a driven pulley 22 which is an other-side pulley on the side of the wheel 16, a belt 24 wound around the drive pulley 20 and the driven pulley 22, an actuator 26 provided on the side of the drive pulley 20, and a gearbox case 27 and a fixed stay 31 shown in FIG. 2 and to be described later.

Figure 3:
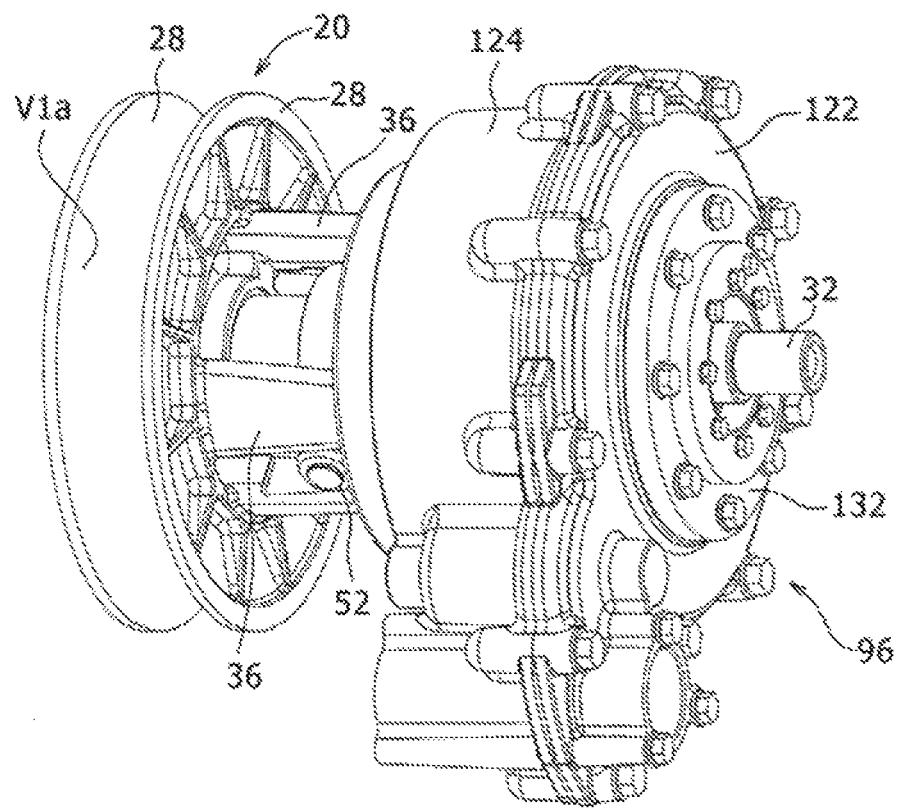
FIG. 3 is a perspective diagram showing the drive pulley of FIG. 2 and a first case element side section of the actuator for changing a belt roll diameter of the drive pulley.

The drive pulley 20 comprises a fixed sheave 30 and a moveable sheave member 28 placed to be moveable relatively in an axial direction with respect to the fixed sheave 30. FIG. 2 is a cross sectional diagram showing a maximum gear increase state of the belt type continuously variable transmission device 12 of FIG. 1. FIG. 3 is a perspective diagram showing the drive pulley 20 of FIG. 2 and a portion of the actuator 26 on the side of a first case element 132. As shown in FIGS. 2 and 3, the fixed sheave 30 has a belt engagement surface V1$a$ provided on a surface on one side in the axial direction and is fixed by a spline engagement section to be not able to relatively rotate with respect to a drive shaft 32 which is the rotational shaft. The drive shaft 32 is coupled and fixed concentrically on an output shaft 34 of the motive power source.

The moveable sheave member 28 is formed by integrally coupling a moveable sheave body 29 and a moveable tube member 54 (FIGS. 2 and 4) to be described later. The moveable sheave body 29 includes a belt engagement surface V1$b$ and a plurality of claw sections 36 protruding to the right side of FIG. 2 which is a side opposite to the belt engagement surface V1$b$ and on the side of the actuator 26 to be described later. As shown in FIG. 5 to be described later, 4 claw sections 36 are provided, but the number of claw sections 36 is not limited to this number and may be a number other than 4, so long as the number is greater than or equal to 2.

Figure 4:
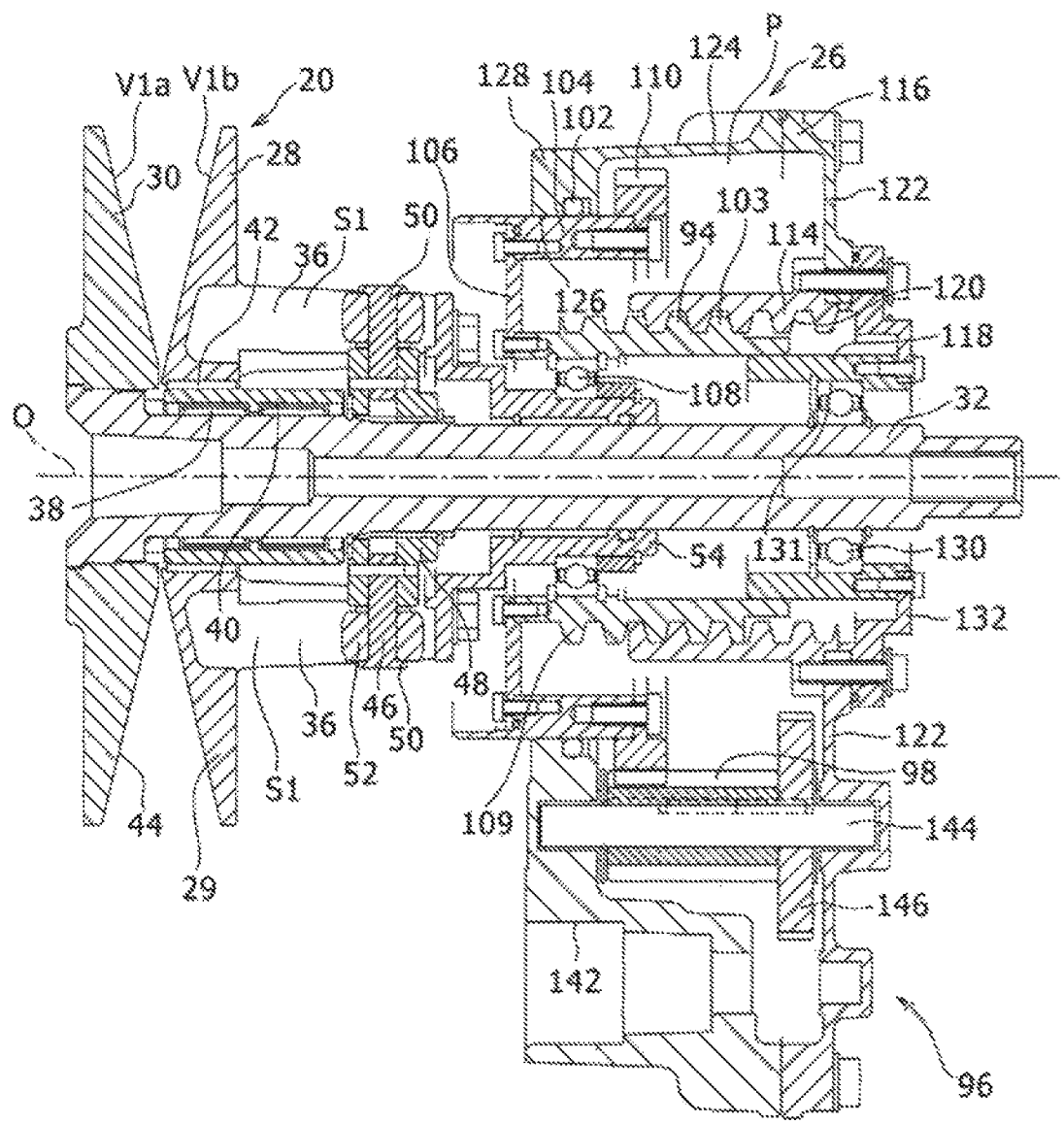
FIG. 4 is a cross sectional diagram of FIG. 3.
Figure 5:
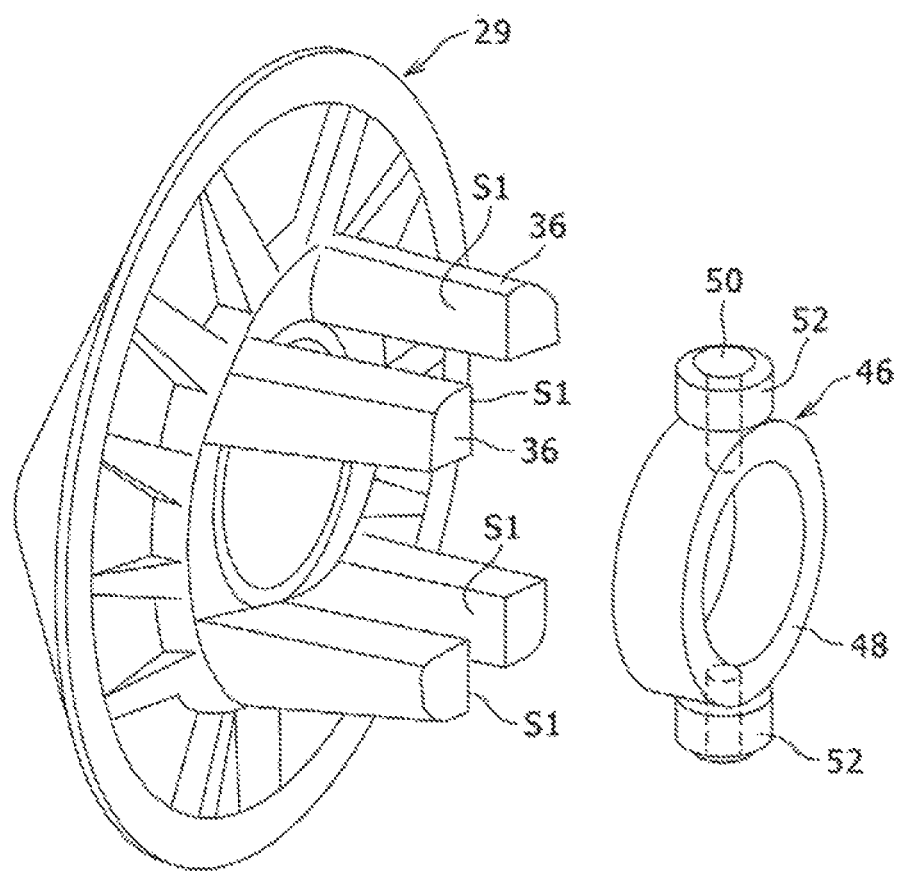
FIG. 5 is a schematic exploded perspective diagram of the moveable sheave body and the torque transmitting member of FIG. 4.

FIG. 4 is a cross sectional diagram of FIG. 3. As shown in FIG. 4, a needle bearing 38 is provided between an inner circumferential surface of the moveable sheave body 29 and an outer circumferential surface of the drive shaft 32. The needle bearing 38 has an outer ring 40 placed via a plurality of needles opposing to the outer circumferential surface of the drive shaft 32. A slide bearing 42 is held on the inner circumferential surface of the moveable sheave body 29 and is provided to allow sliding of the outer ring 40 in the axial direction with respect to the outer circumferential surface of the outer ring 40. The slide bearing 42 is called a "bush". With this structure, the moveable sheave body 29 is placed to be moveable relatively in the axial direction with respect to the fixed sheave 30. In addition, by the space between the belt engagement surfaces V1$a$ and V1$b$ of the fixed sheave 30 and the moveable sheave body 29, a belt engagement groove 44 is formed having a V-shaped cross section. The belt 24 (FIG. 2) is pinched between the belt engagement surfaces V1$a$ and V1$b$.

FIG. 5 is a schematic exploded perspective view of the moveable sheave body 29 and a torque transmitting member 46 in FIG. 4. The claw sections 36 of the drive pulley 20 are placed around the drive shaft 32, and two pairs of the claw sections 36, each pair including two claw sections 36, are provided on opposite sides in a radial direction in relation to center axis of the drive shaft 32 (FIG. 4). In each pair of the claw sections 36, circumferential inner surfaces S1 that face the circumferential direction and oppose each other are flat surfaces along the axial direction of the drive shaft 32 and approximately parallel to each other.

As shown in FIG. 4, the torque transmitting member 46 is provided to be not able to relatively rotate with respect to the drive shaft 32. The torque transmitting member 46 comprises a tubular shaft fixing section 48 fixed by a spline engagement section or a key engagement section on a radially outer side of the drive shaft 43, a support shaft 50 protruding outside in the radial direction at a plurality of locations (2 locations in the exemplified configuration) on the shaft fixing section 48, and a roller 52 supported in a rotatable manner on each support shaft 50. The roller 52 is formed by a resin. As will be described later, the roller 52 is guided between the circumferential inner surfaces S1 that oppose each other, of each pair of the claw sections 36, to move in a direction parallel to the axial direction of the drive shaft 32 while being rotated, and also, the roller 52 presses the circumferential inner surfaces S1 of the claw sections 36 in the direction of rotation of the drive shaft 32, when the drive shaft 32 rotates. A tip of each claw section 36 is fixed on a moveable tube member 54 forming the actuator 26, and this structure will be described later.

Referring again to FIG. 1, the driven pulley 22 comprises a fixed sheave 56, a moveable sheave 58 which can be moved in the axial direction with respect to the fixed sheave 56, a first driven-side torque transmitting member 60 and a second driven-side torque transmitting member 62 shown in FIG. 2, and a spring 64. As shown in FIG. 2, the fixed sheave 56 has a belt engagement surface V2a provided on a surface on one side, a curved section 65 provided on a side opposite in the axial direction from the belt engagement surface V2a and curved toward an inner circumferential side, and a bearing support section 66 provided on an inner circumferential side of the curved section 65. The curved section 65 has a guide hole 68 through the inner and outer sides in the radial direction. The guide hole 68 has two circumferential inner surfaces S2 that oppose each other in the circumferential direction, that are approximately parallel to each other along the axial direction of a driven shaft 70 which is the rotational axis, and that face the circumferential direction.

The bearing support section 66 is rotatably supported by a bearing on an outer circumferential surface of the driven shaft 70, so that relative movement of the driven shaft 70 in the axial direction is blocked. The driven shaft 70 is coupled and fixed concentrically on the input shaft 72 of the gear transmission mechanism 18 (FIG. 1). Alternatively, the driven shaft 70 may be integrally formed with the input shaft 72.

The moveable sheave 58 includes a belt engagement surface V2b provided on one side and a slide bearing 74 provided on an inner circumferential surface. The slide bearing 74 is provided to be held on the inner circumferential surface of the moveable sheave 58 and to allow sliding in the axial direction with respect to the outer circumferential surface of the driven shaft 70. With this structure, the moveable sheave 58 is placed to be moveable relatively in the axial direction with respect to the fixed sheave 56. In addition, a belt engagement groove 76 having a V-shaped cross section is formed by a space between the belt engagement surfaces V2a and V2b of the fixed sheave 56 and the moveable sheave 58. The belt 24 is pinched between the belt engagement surfaces V2a and V2b.

The first driven-side torque transmitting member 60 includes a sheave fixing member 78 fixed on the moveable sheave 58, and a first roller 80 supported on the sheave fixing member 78. The sheave fixing member 78 includes an inner tube section 84 which holds a slide bearing 82 on an inner circumferential surface, and a sheave fixing unit 86 and a claw section 88 provided on the radially outer side of the inner tube section 84. The slide bearing 82 is provided to be slidable in the axial direction on the outer circumferential surface of the driven shaft 70.

The claw section 88 has a tip which extends from one end in the axial direction (right end in FIG. 2) of the inner tube section 84 toward the radially outer side, extends toward the other side in the axial direction (left side in FIG. 2), and branches into two. Circumferential inner surfaces S3 opposing in the circumferential direction of the two branches of the tip are flat surfaces which are approximately parallel to each other along the axial direction of the driven shaft 70. The first roller 80 is formed by a resin, is rotatably supported on a support shaft 83 protruding toward the outside in relation to the radial direction of the driven shaft 70 at the sheave fixing section 86, and is positioned between the inner surfaces S2 of the guide hole 68 and placed to allow movement of the sheave fixing member 78 in the axial direction.

The second driven-side torque transmitting member 62 includes a shaft fixing tube member 90 fixed on the driven shaft 70, and a second roller 93 rotatably supported on a support shaft 91 protruding toward the outside in the radial direction of a shaft fixing tube member 90. On the driven shaft 70, the shaft fixing tube member 90 is provided closer to the moveable sheave 58 in relation to the shaft direction than the inner tube section 84 of the sheave fixing member 78.

The second roller 93 is formed by a resin, and is positioned between the inner surfaces S3 of the claw section 88 and placed to allow movement in the axial direction of the sheave fixing member 78. As will be described later, during the rotation of the driven pulley 22, the circumferential inner surface S2 of the guide hole 68 of the fixed sleeve 56 presses the first driven-side torque transmitting member 60 in the rotational direction of the fixed sheave 56, and the circumferential inner surface S3 of the claw section 88 presses the second driven-side torque transmitting member 62 in the rotational direction of the moveable sheave 58.

The spring 64 is provided between the inner surfaces, opposing each other in the axial direction, of the shaft fixing tube member 90 and the sheave fixing member 78, and urges the moveable sheave 58 in the right direction of FIG. 2 which is a direction toward the fixing sheave 56.

In the drive pulley 20 and the driven pulley 22, the positional relationships in the axial direction between the fixed sheaves 30 and 56 and the moveable sheave member 28 and the moveable sheave 58 are opposite to each other. Such a configuration is employed in order to smoothly change a roll diameter of the belt 24 at the driven pulley 22 in accordance with a change of the roll diameter of the belt 24 at the drive pulley 20 by the actuator 26, to be described later.

Alternatively, a configuration may be employed in which the moveable sheave member 28 is placed on the side of the motive power source 14 with respect to the fixed sheave 30 in the drive pulley 20, and the moveable sheave 58 is placed at an opposite side from the gear transmission mechanism 18 with respect to the fixed sheave 56 at the driven pulley 22.

Next, the actuator 26 will be described in detail with reference to FIGS. 2-6. The actuator 26 is used to move the moveable sheave member 28 of the drive pulley 20 in a reciprocating manner in the axial direction using a feed screw mechanism driven by the motive power of the electric motor 92, and to change a sheave spacing which is a distance between the fixed sheave 30 and the moveable sheave member 28. With the change of the sheave spacing, the gear reduction ratio between the drive shaft 32 and the driven shaft 70 is changed. The actuator 26 includes a moveable feed member 94, a gear case 96, the electric motor 92, and a gear mechanism 100 having an output gear 98.

As shown in FIG. 4, the moveable feed member 94 has an inner tube section 103, an outer tube section 104, and a lid section 106. The moveable feed member 94 is supported on a radially outer side of the moveable tube member 54 fixed on the moveable sheave body 29, in a rotatable manner around a center axis O of the drive shaft 32 which is the center of the rotational shaft by a bearing 108.

The moveable tube member 54 is supported to be slidable in the axial direction on the outer circumferential surface of the drive shaft 32. Alternatively, a slide bearing which slides against the outer circumferential surface of the drive shaft 32 may be provided on the inner circumferential surface of the moveable tube member 54. One end in the axial direction of the moveable tube member 54 is fixed on a tip surface of the claw section 36 of the moveable sheave body 29 by a bolt joint.

The inner tube section 103 has a moveable-side feed screw 109 provided on the outer circumferential side. The bearing 108 has an outer ring and an inner ring fixed by a means including a locking ring on the moveable tube member 54 and the inner tube section 103, in order to prevent relative displacement of the moveable feed member 94 in the axial direction with respect to the moveable tube member 54. The bearing 108 is, for example, a bearing with a seal.

The outer tube section 104 is placed concentrically on the radially outer side which is a periphery of the inner tube section 103, and an outer gear 110 is mounted on one end side (on a side opposite from the drive pulley 20 in relation to the axial direction (right side in FIG. 2)) of the outer tube section 104. In the outer tube section 104, an outer circumferential surface on the side of the drive pulley 20 (left side in FIG. 2) in relation to the outer gear 110 in the axial direction, is formed as a circular tubular surface.

The lid section 106 is formed in an approximate circular plate shape, and connects the end surfaces of the inner tube section 103 and the outer tube section 104 at the side of the drive pulley 20 (left side of FIG. 2) through a bolt joint.

Figure 6:
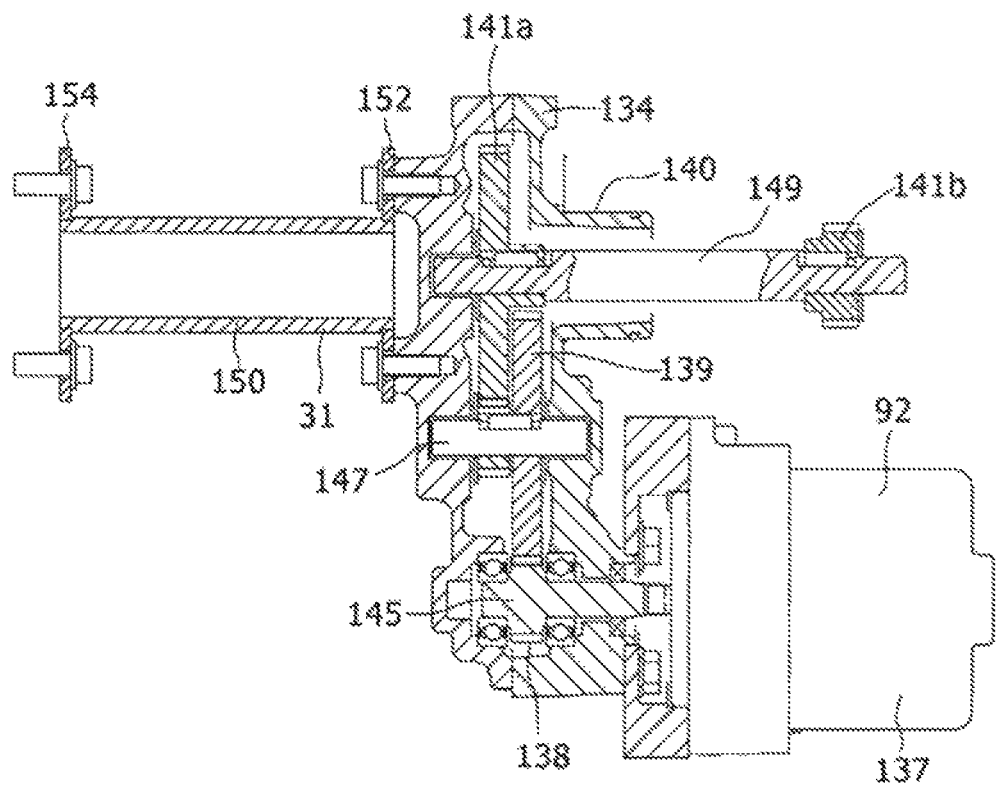
FIG. 6 is a cross sectional diagram showing the second case element side section in the actuator of FIG. 2.

The gear case 96 is formed by a first case element 132 on the side of the drive shaft 32 shown in FIGS. 3 and 4, and a second case element 134 on the side of the electric motor 92 shown in FIG. 6. As shown in FIG. 4, the first case element 132 comprises a fixed tube section 114, an outer cover 116, and a second fixed tube member 118. The fixed tube section 114 has a fixed-side feed screw 120 provided on the inner circumferential side, and is provided concentrically on the radially outer side of the inner tube section 103. The fixed-side feed screw 120 is screw-engaged with the moveable-side feed screw 109. A feed screw mechanism is formed by the fixed-side feed screw 120 and the moveable-side feed screw 109. For the feed screw, 3 trapezoidal screws are used. The structure, however, is not limited to such a configuration, and one or two trapezoidal screws may instead be employed.

The outer cover 116 is provided integrally on the fixed tube section 114 to cover the periphery of the fixed tube section 114. The outer cover 116 has a rear end-side plate section 122 provided on a side opposite of the drive pulley 20 in relation to the axial direction, a tubular wall section 124 provided on the outer circumferential side of the plate section 122, and a tip-side plate section 128 provided on the side of the drive pulley 20 of the wall section 124. On the rear end-side plate section 122, the fixed tube section 114 is fixed to protrude from the inner surface of the plate section 122 toward the side of the drive pulley 20.

The tip-side plate section 128 has an opening 126 which is formed on the side of the drive pulley 20 (left side of FIG. 4) in relation to the outer gear 110 of the moveable feed member 94, in relation to the axial direction and which has a circular tubular shape. A circular tubular outer circumferential surface of the outer tube section 104 is inserted into the opening 126. The opening 126 proximately opposes the outer circumferential surface of the pulley-side section. Here, "proximately oppose" means that a small gap in the radial direction is formed between the opening 126 and the outer circumferential surface of the pulley-side section or that the opening 126 and the outer circumferential surface of the pulley-side section oppose with almost no gap therebetween. With this configuration, the outer cover 116 houses the outer gear 110.

An O-ring 102 which is a sealing member is provided between the opening 126 and the outer tube section 104. The O-ring 102 is locked on a locking groove formed on an entire circumference of the inner circumferential surface of the opening 126 at the tip-side plate section 128 of the outer cover 116, and slides and contacts the circular tubular outer circumferential surface of the outer tube section 104. The O-ring 102 prevents intrusion of foreign objects from the side of the drive pulley 20 into an outer gear placement space P in which the outer gear 110 is placed. Alternatively, the O-ring 102 may be locked in a locking groove formed on the outer circumferential surface on the side of the drive pulley 20 in relation to the outer gear 110 in relation to the axial direction of the drive shaft 32 at the outer tube section 104, and may slide and contact the inner circumferential surface of the opening 126.

The second fixed tube member 118 which is the second fixed tube section is formed in a tubular shape having a circular tubular surface as the outer circumferential surface, and is fixed on the plate section 122 at a radially inner side of the fixed tube section 114 and coaxially with the fixed tube section 114, protruding from the inner surface of the rear end-side plate section 122 toward the drive pulley 20. The second fixed tube member 118 has a bearing support section 131 which supports the bearing 130 at the inner circumferential surface side between the second fixed tube member 118 and the outer circumferential side of the drive shaft 32, and is supported in a manner to be rotatable with respect to the central axis O of the drive shaft 32 which is the center of the rotational shaft with respect to the drive shaft 32, by the bearing 130, and also not able to relatively move in the axial direction. For example, bearing 130 includes sealing member.

The second fixed tube member 118 slides and contacts with the inner circumferential surface of the inner tube section 103 or opposes the inner circumferential surface of the inner tube section 103 with a very small gap therebetween in all cases of relative movement of the movement sheave member 28 with respect to the fixed sheave 30, that is, over the entirety of a moveable range of the inner tube section 103 in the axial direction, as will be described later. Alternatively, an O-ring (not shown) may be provided between the outer circumferential surface of the second fixed tube member 118 and the inner circumferential surface of the inner tube section 103.

In the first case element 132, a part of the gear mechanism 100 to be descried later is housed and supported, and in the second case element 134 of FIG. 6, the remaining part of the gear mechanism 100 is housed and supported. In addition, the first case element 132 is configured to include a one-side case element 158 and an other-side case element 160 which are branched along the axial direction of the drive shaft 32 and coupled to each other by a bolt 156 (FIG. 4) functioning as a fastening means. For example, the one-side case element 158 includes a part of the wall section 124 and the tip-side plate section 128, and the other-side case element 160 includes the remaining part of the wall section 124, the rear end-side plate section 122, the fixed tube section 114, and the second fixed tube member 118. In a state where the ends of the one-side case element 158 and the other-side case element 158 are abutted against each other, the two case elements 158 and 160 are coupled and fixed by the bolt 156. A tapped hole may be formed on the other-side case element 160, and an insertion hole into which the bolt is inserted may be formed on the one-side case element 158. The second case element 134 has a tube section 140 protruding on one side, and the gear case 96 (FIG. 2) is formed by the tube section 140 being inserted into a hole section 142 formed in the first case element 132 of FIG. 4, and fixed to the first case element 132. The inside of the hole section 142 is isolated from the outside by the second case element 134.

As shown in FIG. 2, the electric motor 92 has a motor case 137 fixed on the second case element 134 on a side opposite to the drive pulley 20 in relation to the axial direction. Driving of the electric motor 92 is controlled by a controller (not shown), and the electric motor 92 drives the output gear 98 (FIG. 4) via the gear mechanism 100 to be described later. The electric motor 92 allows rotational driving in both directions. One or more detection signals of one or both of rotational speed and throttle opening of a throttle valve when the motive power source is an engine of an internal combustion engine, for example, are transmitted to the controller from one or more sensors (not shown). The controller calculates a target rotational direction and a target amount of rotation of the electric motor based on the detection signal(s) of one or both of the engine rotational speed and throttle opening, and controls driving of the electric motor 92 for rotation in the target rotational direction for the target amount of rotation. Alternatively, in place of the detection signal of the throttle opening, a detection signal representing a pedal position of an acceleration pedal detected by an acceleration pedal sensor may be used.

As the electric motor 92, for example, a three-phase synchronous motor or a three-phase induction motor is used. In this case, the controller controls the driving of the electric motor 92 via a motor driver (not shown), according to a transmission pattern which is set in advance according to a detected value of the rotational speed of the engine and throttle opening. For example, the gear reduction ratio may be set to become smaller as the rotational speed of the engine becomes higher. The motor driver has an inverter which is connected to a battery which is a direct current power supply. The inverter converts the DC current supplied from the battery into an AC current. The inverter generates a desired AC current which is a drive current of the electric motor 92 according to the control signal from the controller, and drives the electric motor 92. Alternatively, the controller may control the driving of the electric motor 92 so as to change the gear reduction ratio according to the detected position of the acceleration pedal while the rotational speed of the engine is set constant.

The gear mechanism 100 includes a first gear shaft 144 supported on the first case element 132, a large-size gear 146 fixed on the first gear shaft 144, a plurality of second gear shafts 145, 147, and 149 supported on the second case elements 134, and gears 138, 139, 141a, and 141b fixed on the second gear shafts 145, 147, and 149. The second gear shaft 145 is connected to the rotational shaft of the electric motor 92. On the second gear shaft 149, the gears 141b and 141a which intermesh with the large-side gear 146 are fixed, and the second gear shaft 149 is supported in a manner to be rotatable with respect to both the first case element 132 and the second case element 134. The gear 141b is fixed at a section, of the gear shaft 149, protruding from the tube member 140, and inserted into the first case element 132.

The output gear 98 is integrally fixed on the first gear shaft 144 with the large-size gear 146, and has a total length to cover all of the moveable range in the axial direction of the outer gear 110 fixed on the outer tube section 104. The gear mechanism 100 transmits the motive power from the electric motor 92 to the output gear 98 while gear-reducing. As will be described later, when the output gear 98 is driven, the output gear 98 rotates the movable feed member 94 and moves the moveable feed member 94 in the axial direction by an action of the feed screw mechanism.

As shown in FIG. 6, a fixed stay 31 includes a tube section 150, and plate sections 152 and 154 provided on both ends of the tube section 150. The plate section 152 on one side is fixed on a side surface of the second case element 134 on the side of the belt 24 (FIG. 2) by a bolt, the tube section 150 protrudes toward the belt 24, and the plate section 154 is placed on a section of the tube section 150 protruding from the belt 24 on a side opposite of the electric motor 92. Alternatively, the plate section 154 may be placed at a position, in the tube section 150, passing through the inside of the belt 24.

Figure 7:
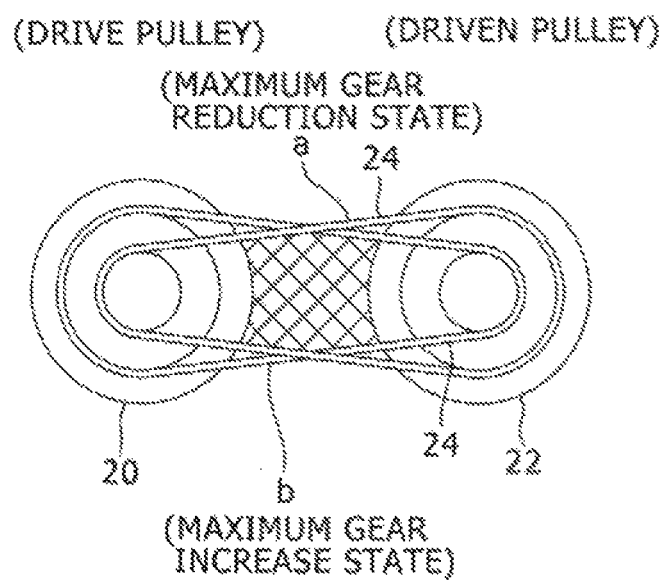
FIG. 7 is a diagram showing a belt wrapping position between the drive pulley and the driven pulley in a maximum gear reduction state and a maximum gear increase state.

As shown in FIG. 2, a gearbox case 27 is formed by a metal such as iron and an aluminum alloy, and houses in the inside the drive pulley 20, the actuator 26, the driven pulley 22, and the belt 24. On the inner surface of the gearbox case 27, the plate section 154 on the other side of the fixed stay 31 is fixed by a fastening means including a bolt. The fixed stay 31 is placed to penetrate through the inside of the belt 24 in a state where the belt 24 is bridged over the drive pulley 20 and the driven pulley 22, and the plate section 154 is fixed on the inner surface of the gearbox case 28. In this case, as shown in FIG. 7, the bridging position of the belt 24 changes between the "a" position which is at a maximum gear reduction state and the "b" position which is at a maximum gear increase state, and the fixed stay 31 is placed to penetrate through the slanted grid range of FIG. 7 showing the inside of the space forming an inner side region of the belt 24 over all setting states of the belt position. The gearbox case 27 may be fixed on a frame which forms the vehicle body (not shown) or on a case of the gear transmission mechanism 18.

The belt type continuously variable transmission device 12 having the above-described structure changes the transmission ratio between the drive shaft 32 and the driven shaft 70 in the following manner. First, as described above, based on detected values detected by one or more sensors, the controller rotationally drives the electric motor 92 in a predetermined direction and by a predetermined amount. In this case, for example, the gear mechanism 100 is rotated by a rotation in one direction of the electric motor 92, and the outer gear 110 which intermeshes with the output gear 98 is rotationally driven in one direction. In this case, the inner tube section 103 also rotates in the same direction as the outer gear 110, and, because the inner tube section 103 is screw-engaged with the fixed tube section 114 fixed on the gear case 96, the inner tube section 103 moves in one side in the axial direction while being rotated by an action of the feed screw mechanism. For example, when the inner tube section 103 moves to the left side of FIG. 2, the moveable tube member 54 also moves in one side in the axial direction, and, as shown in FIG. 2, the moveable sheave member 28 of the drive pulley 20 approaches the fixed sheave 30, the sheave spacing is reduced, and the roll diameter of the belt 24 at the drive pulley 20 becomes larger.

On the other hand, in relation to the tension applied on the belt 24, at the driven pulley 22, the belt 24 resists the urging force of the spring 64 to move the moveable sheave 58 away from the fixed sheave 56, so that the roll diameter of the belt 24 is reduced. With this process, the motive power of the drive shaft 32 is gear-increased at the belt 24 and is transmitted to the driven shaft 70. FIG. 2 shows a case of the maximum gear increase state.

In addition, in this case, because the torque transmitting member 46 is guided to the circumferential inner surface S1 of the claw section 36, the moveable sheave member 28 can be moved in the axial direction of the drive shaft 32 with respect to the torque transmitting member 46. Moreover, during the rotation of the drive shaft 32, because the roller 52 of the torque transmitting member 46 presses the circumferential inner surface S1 in the rotational direction of the drive shaft 32, the torque is transmitted from the drive shaft 32 to the moveable sheave member 28.

In addition, the first driven-side toque transmitting member 60 of the driven pulley 22 is pressed in the rotational direction of the fixed sheave 56 by the circumferential inner surface S2 of the guide hole 68 of the fixed sheave 56, and the second driven-side torque transmitting member 62 is pressed in the rotational direction of the moveable sheave 58 by the circumferential inner surface S3 of the sheave fixing member 78 fixed on the moveable sheave 58. Because of this, torque is transmitted from the driven pulley 22 to the driven shaft 70.

Figure 8:
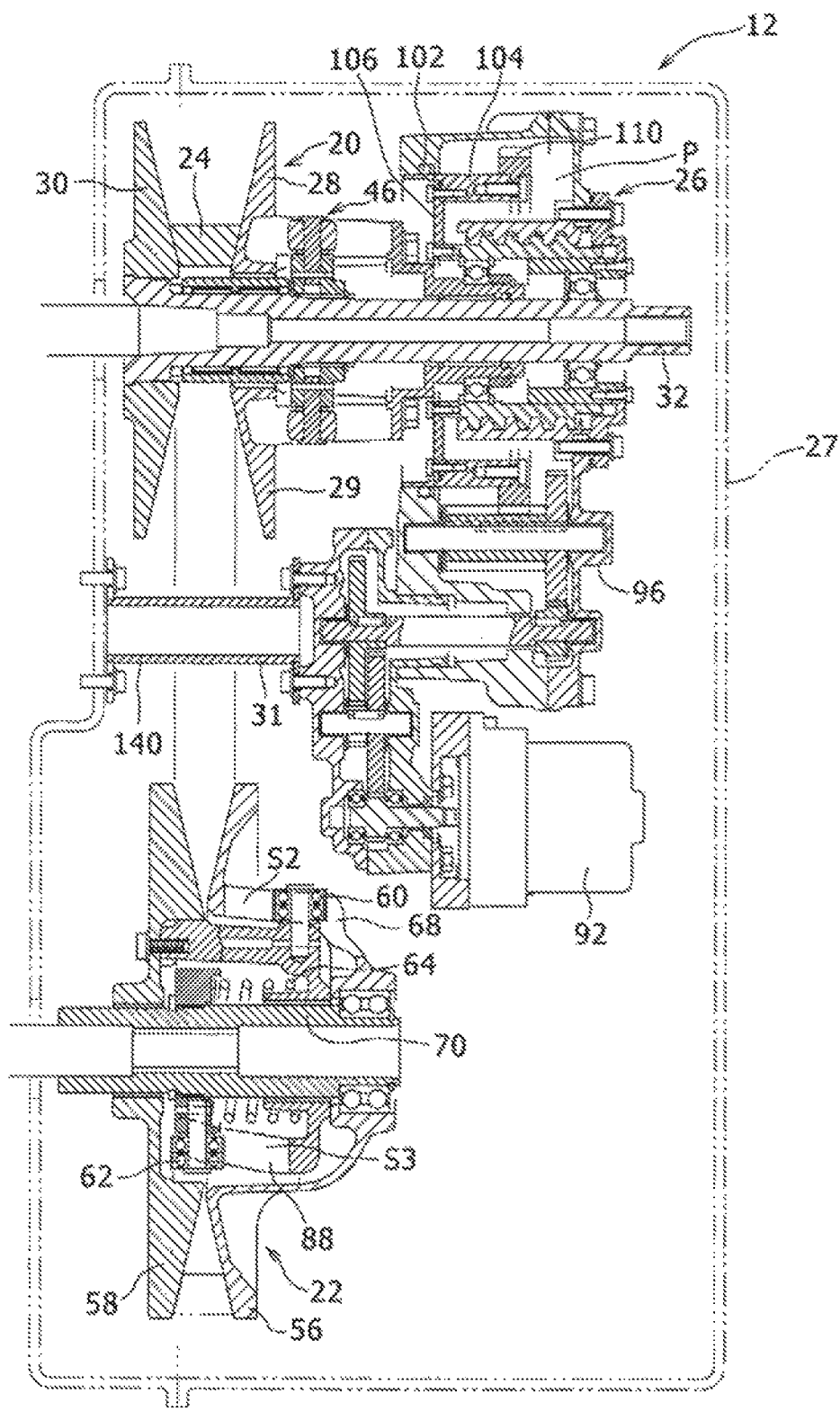
FIG. 8 is a cross sectional diagram showing a maximum gear reduction state of the belt type continuously variable transmission device of FIG. 1.

On the other hand, when the electric motor 92 is rotationally driven in the reverse direction, the outer gear 110 is rotationally driven in a reverse direction to that described above, via the gear mechanism 100. Because the inner tube section 103 rotates in a same direction as the outer gear 110 in this case also, the inner tube section 103 moves to the other side in the axial direction by an action of the feed screw mechanism. For example, when the inner tube section 103 moves to the right side of FIG. 2, the moveable tube member 54 moves to the other side in the axial direction while being rotated, and the moveable sheave member 28 of the drive pulley 20 moves away from the fixed sheave 30 as shown in FIG. 8. In this case, the sheave spacing is increased and the roll diameter of the belt 24 at the drive pulley 20 is reduced.

In relation to the tension applied to the belt 24, in the driven pulley 22, the moveable sheave 58 moves toward the fixed sheave 56 by the urging force of the spring 64. Because of this, the roll diameter of the belt 24 is increased, and the motive power of the drive shaft 32 is transmitted to the driven shaft 70 with gear reduction.

In this case also, the torque of the drive shaft 32 is transmitted to the drive pulley 20 by the torque transmitting members 46, 60, and 62, and the torque of the driven pulley 22 is transmitted to the driven shaft 70.

Further, the outer gear 110 of the moveable feed member 94 is housed by the outer cover 116 of the gear case 96, and the opening 126 provided on the gear case 96 proximately opposes the outer circumferential surface of the outer tube section 104 of the moveable feed member 94 at a side nearer to the drive pulley 20 than the outer gear 110 in relation to the axial direction of the drive shaft 32. Because of this structure, foreign objects tend not to enter the intermeshing section of the outer gear 110. In addition, foreign objects or other members do not collide the outer gear 110 in a state before the outer gear 110 is assembled in the gearbox case 27 which houses the drive pulley 20 and the driven pulley 22. Because of this, the endurance of the gear in the structure for transmitting the rotational force from the electric motor 92 to the member having the feed screw can be improved. Moreover, with the O-ring 102 provided between the outer tube section 104 and the outer cover 116, intrusion of foreign objects from the side of the drive pulley 20 to the outer gear placement space P can be inhibited, and thus, the endurance of the gear intermeshing section can be further improved. In addition, the electric motor 92 is fixed on the gear case 96 provided on the side of the moveable feed member 94 in relation to the belt 24, the fixed sheave 30 is fixed on the drive shaft 32, and the moveable sheave member 28 is placed to be able to relatively move in the axial direction with respect to the fixed sheave 30 by the slide bearing 42 or the like. Because of this, during the assembly work, the drive shaft 32, the drive pulley 20, and the actuator 26 can be handled as an integral component with a compact structure in a state before these components are placed in the gearbox case 27 which houses the drive pulley 20. Therefore, the assembly work can be facilitated while not reducing the endurance of the gear.

The second fixed tube member 118 slides and contacts the inner circumferential surface of the inner tube section 103 or opposes the inner circumferential surface of the inner tube section 103 with a very small gap therebetween over the entire moveable range of the inner tube section 103 in the axial direction. Because of this structure, a closed space is formed between the fixed tube section 114 and the second fixed tube member 118, and intrusion of foreign objects into a placement section of the engagement sections of the feed screws 109 and 120 of the inner tube section 103 and the fixed tube section 114 can be inhibited. The outer gear placement space P is tightly sealed from the outside, and endurance of both the gear intermesh section of the outer gear 110 and the engagement sections of the feed screws 109 and 120 can be improved.

In addition, the fixed stay 31 is provided for fixing the gear case 96 inside the gearbox case 27 which is a separate member and which is placed to penetrate through the space forming the inner region of the belt 24 over all setting states of the position of the belt 24. Because of this, unlike the case where the fixed stay is placed outside the belt 24, the size of the continuously variable transmission device 12 including the actuator 26 can be reduced. Moreover, because the belt 24 can be replaced while the fixed stay 31 is maintained in a state if being attached to the gearbox case 27, the maintainability can be improved.

Alternatively, a configuration may be employed in which the gearbox case 27 is not provided and the gear case 96 is directly mounted by the fixed stay 31 on a case of the gear transmission mechanism 18 which is a separate member. In this case, the gear transmission mechanism 18 and the actuator 26 can be formed as one unit, and the size can therefore be reduced. Alternatively, the gear case 96 may be directly mounted on a frame which forms the vehicle body which is a separate member, by the fixed stay 31.

Alternatively, in the drive shaft 32 in the structure of FIG. 2, a bearing may be provided between the end on the side opposite to the output shaft 34 and the gearbox case 27, and the output shaft 34 may be rotatably supported on the gearbox case 27. With this configuration, the rotation of the drive shaft 32 integral with the output shaft 34 may be transmitted to the outside by the gearbox case 27.

In the present embodiment, the moveable sheave member 28 is formed from the moveable sheave body 29 and the moveable tube member 54, but alternatively, the moveable sheave member may be formed from only the moveable sheave body. In addition, the left/right positions of the coupling sides of the motive power source 14 and the input shaft 72 of the gear transmission mechanism 18 on the drive shaft 32 and the driven shaft 70 may be inverted from those shown in FIG. 2. Moreover, the inside/outside relationship in the radial direction of the inner tube section 103 and the fixed tube section 114 forming the feed screw mechanism may be inverted.

Figure 9:
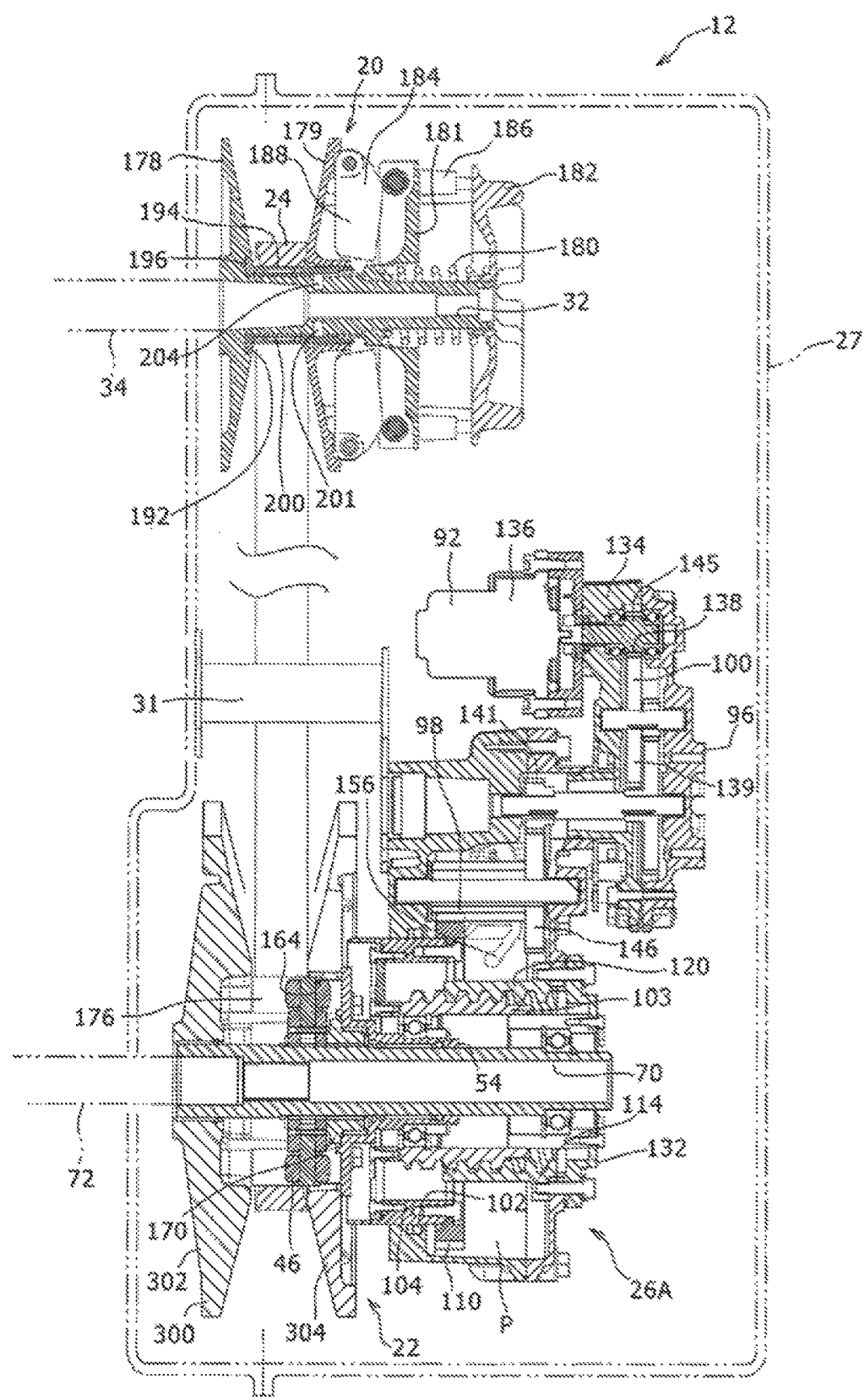
FIG. 9 is a diagram corresponding to FIG. 2 and showing a first alternative configuration of the embodiment of the present invention.
Figure 10:
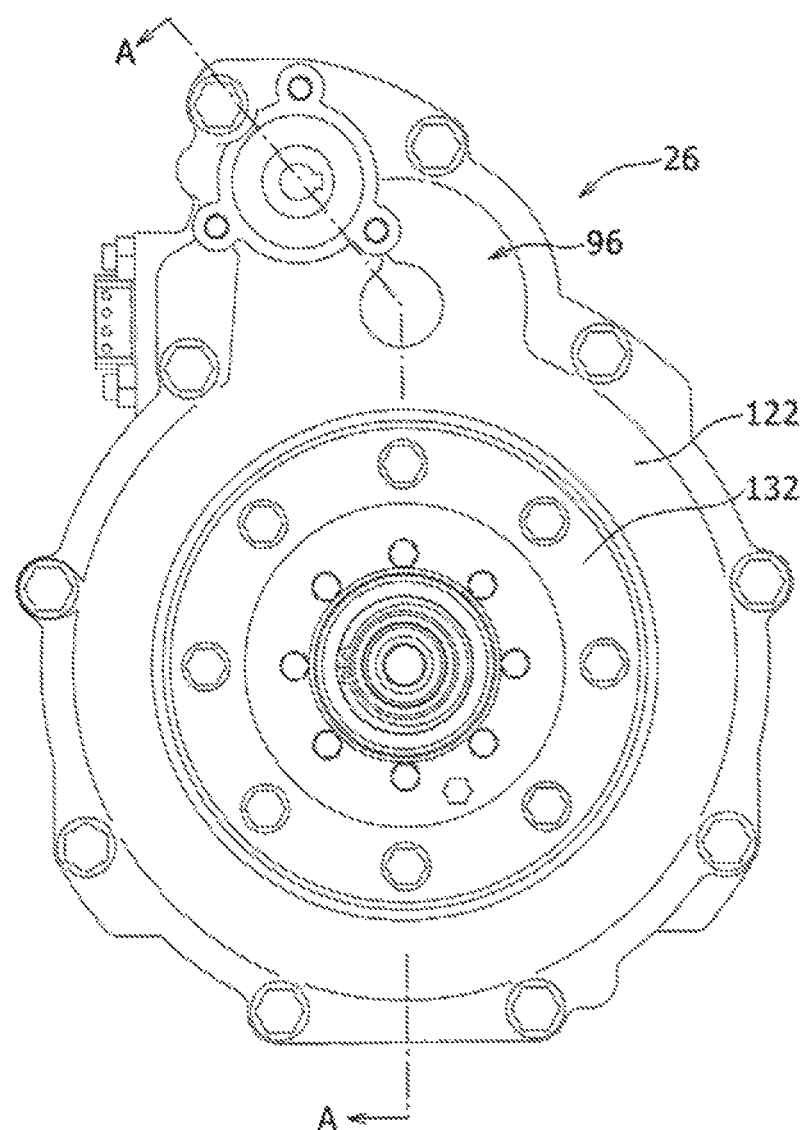
FIG. 10 is a diagram focusing on the first case element side section of the actuator of FIG. 9 and viewed from the right side of FIG. 9.
Figure 11:
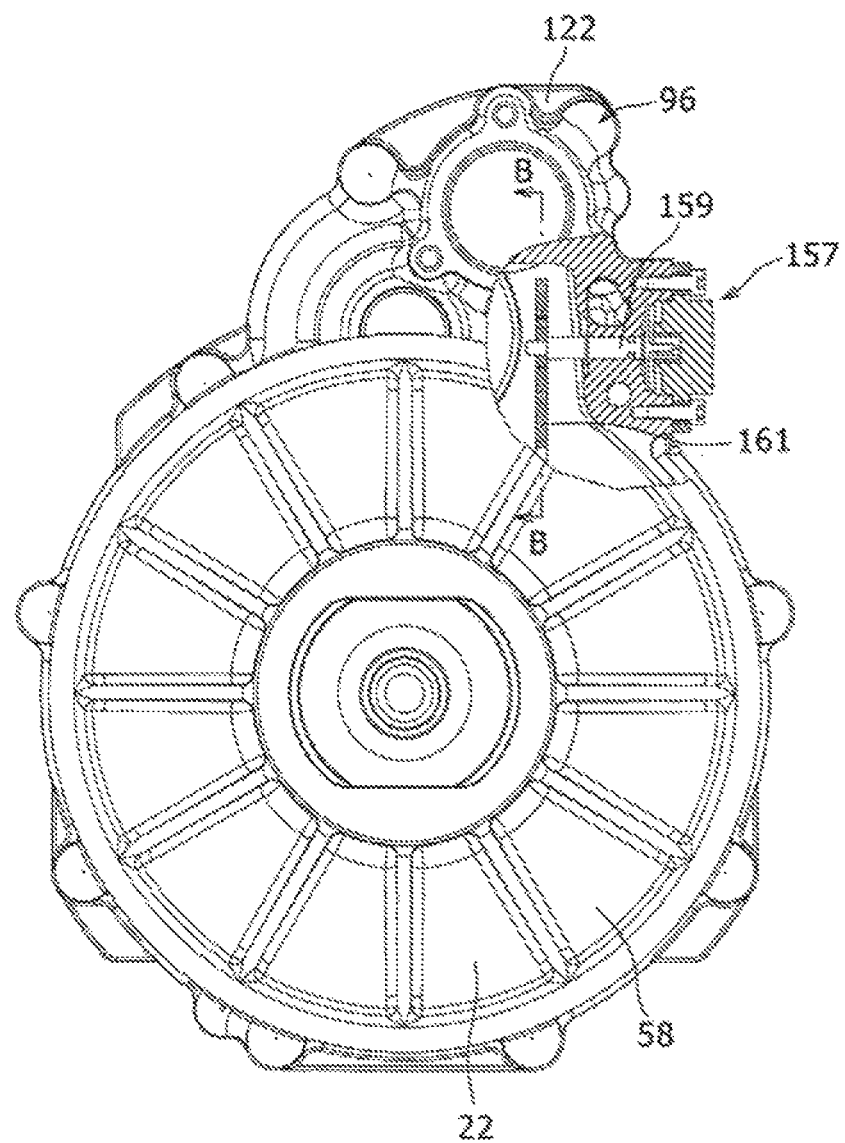
FIG. 11 is a diagram of the first case element side section of the actuator viewed from the left side of FIG. 9.

FIG. 9 is a diagram corresponding to FIG. 2 in a first alternative configuration of the embodiment of the present invention. FIG. 10 is a diagram focusing on the section on the side of the first case element 132 of the actuator 26A of FIG. 9 and viewed from the right side of FIG. 9. FIG. 11 is a diagram of the section on the side of the first case element 132 of the actuator 26A viewed from the left side of FIG. 9. In FIG. 9, the roll diameters of the belt 24 are minimum in the drive pulley 20 and the driven pulley 22. This configuration shows the maximum gear reduction state and the maximum gear increase state in the drive pulley 20 and the driven pulley 22, respectively, and in the same state in reality, the large/small relationships of the roll diameter of the belt 24 in the drive pulley 20 and the driven pulley 22 are opposite or the same roll diameter.

Figure 12:
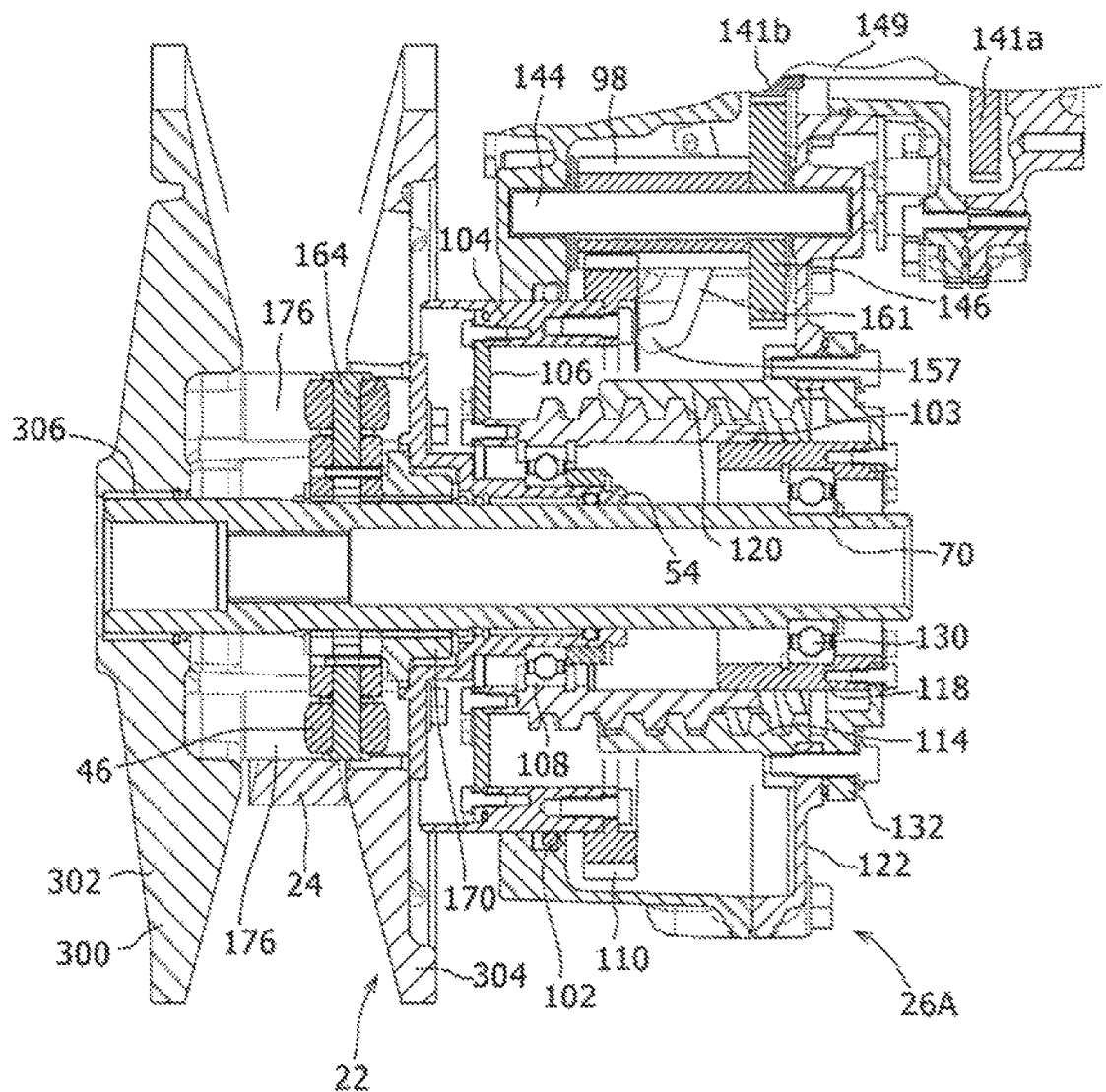
FIG. 12 is a cross sectional diagram along an A-A line of FIG. 10.

In the present configuration, of the drive pulley 20 and the driven pulley 22, the actuator 26A for changing the sheave spacing is provided on the side of the driven pulley 22. In this case, the driven pulley 22 corresponds to the one-side pulley and the drive pulley 20 corresponds to the other-side pulley. A moveable sheave member 300 is placed on the left side of FIG. 9 which is the side of the gear transmission mechanism 18 (refer to FIG. 1) with respect to a fixed sheave 304. The moveable sheave member 300 is formed by fixing the moveable tube member 54 on a moveable sheave body 302. The structure of the moveable sheave body 302 is similar to a structure in which the left/right positions of the moveable sheave body 29 shown in FIGS. 2 and 4 are inverted and a claw section 176 is formed on the side of the belt engagement surface. As shown in FIG. 12, on the inner circumferential surface of the moveable sheave body 302, a slide bearing 306 is held, and the moveable sheave member 300 is supported to be able to move relatively in the axial direction with respect to the driven shaft 70. A detailed structure of the fixed sheave 304 will be described later.

Referring again to FIG. 9, some of the gears, that is, gears 138 and 139, forming the gear mechanism 100 and the second case element 134 which houses these gears 138 and 139 are provided at a position at a side opposite (right side of FIG. 9) to the driven pulley 22 in relation to the output gear 98, in relation to the axial direction of the driven shaft 70.

In addition, the belt type continuously variable transmission device 12 of the present configuration includes a sheave position sensor 157 which detects an axial position of the moveable sheave member 300. As shown in FIG. 11, the sheave position sensor 157 is mounted on the first case element 132 forming the gear case 96. The sheave position sensor 157 includes a rotational shaft 159 supported and protruding from the sensor case fixed on the first case element 132 to the inside of the first case element 132, and a rocking arm 161 fixed on the tip of the rotational shaft 159. As shown in FIG. 12, one end of the rocking arm 161 opposes an end surface in the axial direction of the outer tube section 104.

Figure 13A:
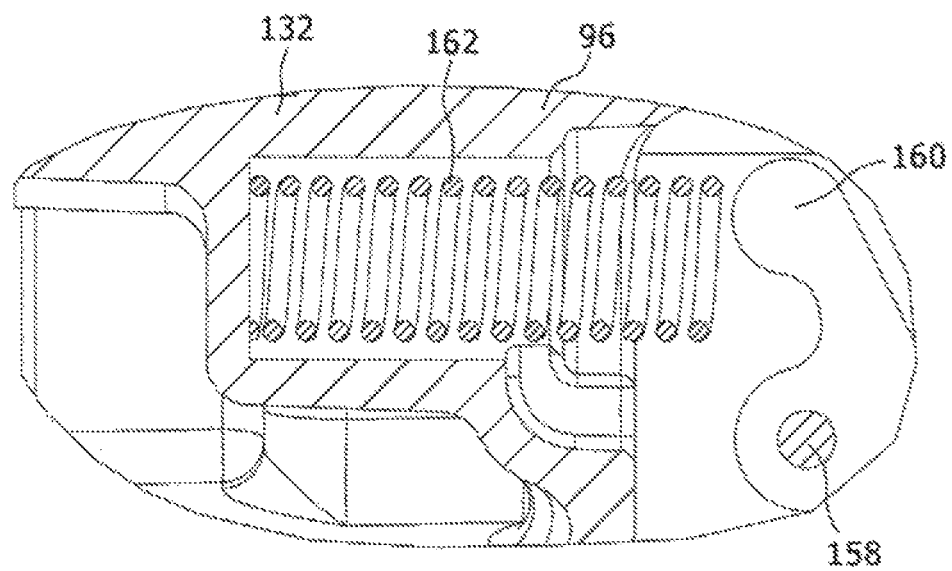
FIG. 13A is a cross sectional diagram along a B-B line of FIG. 11.

FIG. 13A is a cross sectional diagram along a B-B line of FIG. 11. As shown in FIG. 13A, the rocking arm 161 is placed to be rotatable around the rotational shaft 159, and the other end of the rocking arm 161 is pressed by a spring 162 in a direction in which the one end of the rocking arm 161 of FIG. 12 contacts an end surface in the axial direction of the outer gear 110.

Figure 13B:
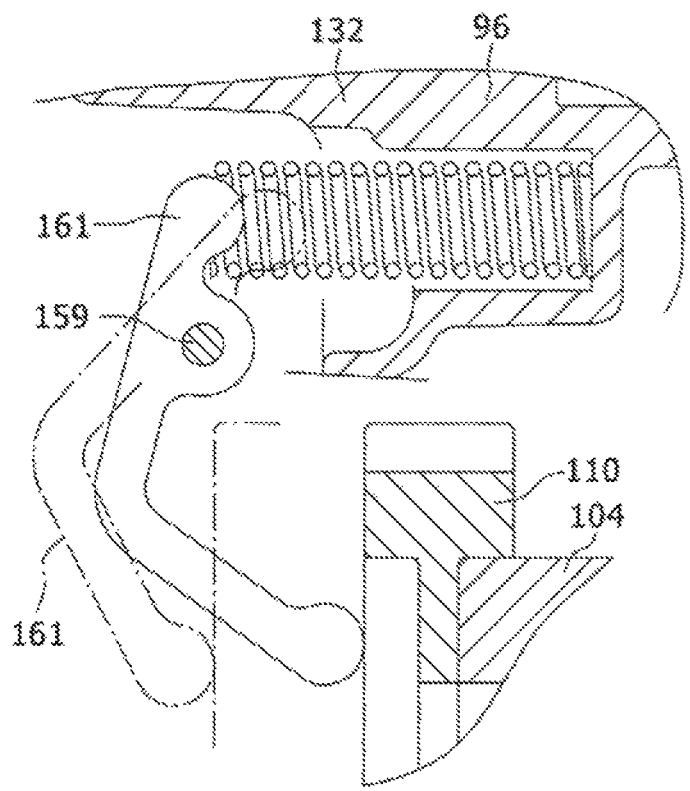
FIG. 13B is a diagram corresponding to FIG. 13A and showing a state of rocking of rocking arm by moving of an outer gear of another embodiment.
Figure 14:
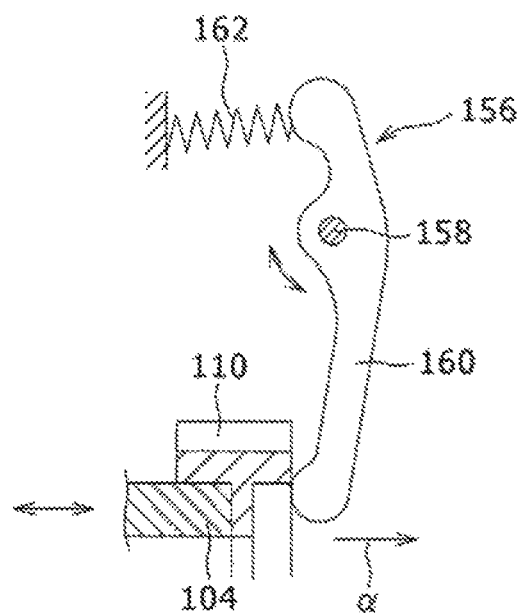
FIG. 14 is a schematic view showing a principle of detection of an axial position of the moveable sheave member by a sheave position sensor in the first alternative configuration.

FIG. 14 is a schematic view showing a principle of detection of the axial position of the moveable sheave member 300 (FIG. 12) by the sheave position sensor 157. When the one end of the rocking arm 161 is pressed by the axial direction end surface of the outer gear 110 in a direction indicated by an arrow α, the rocking arm 161 rocks around the rotational shaft 159, resisting the urging force of the spring 162. With this sheave position sensor 157, the axial position of the moveable sheave member 300 which moves from the rotational position of the rotational shaft 159 in synchronization with the outer tube section 104 can be detected. A detection signal representing the axial position of the moveable sheave member 300 detected by the sheave position sensor 157 is transmitted to the controller. As shown in FIG. 13B, the rocking arm 161 which is bended may be rocked by being pressed by the outer gear 110.

Alternatively, a configuration may be employed in which the sheave position sensor 157 has a function to detect only the rotational position of the rocking arm 161, and a signal representing the detected value is transmitted to the controller. In this case, the controller can store in advance, in a memory unit, a relationship between the axial position of the moveable sheave member 300 and the rotational position of the rocking arm 161, and calculate and detect the axial position of the moveable sheave member 300 based on the detected value of the rotational position of the rocking arm 161. In a structure which uses such a sheave position sensor 157, in comparison to the case of the structure detecting the axial position of the moveable sheave member 300 based on the rotational position of the gear of the gear mechanism 100, the detection position becomes closer to the member on the side of the moveable sheave member 300 and the detection error of the sensor can be reduced. The sheave position sensor 157 may also be employed in the structure of FIGS. 1-8 described above.

Figure 16:
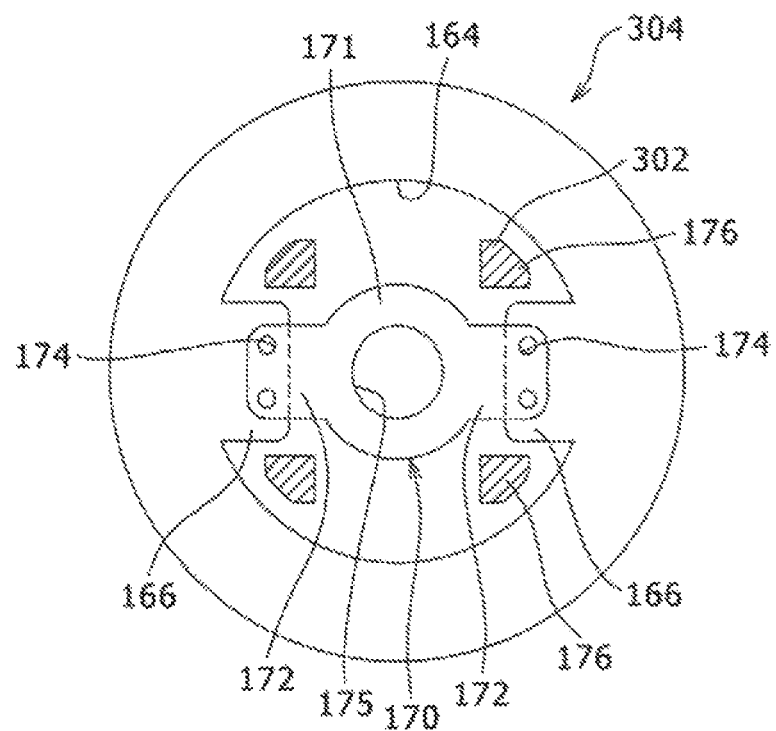
FIG. 16 is a schematic view showing a shaft fixing member fixed on the fixed sleeve in the structure of FIG. 12.

In addition, as shown in FIG. 16 to be described later, a through hole 164 is formed at the center section of the fixed sheave 304. The fixed sheave 304 has a projection 166 which protrudes from two locations on the side opposite in the radial direction in relation to the center axis of the inner circumferential surface of the through hole 164 toward inside in the radial direction.

On the surface on the side opposite to the belt engagement surface of the fixed sheave 304 (right side surface of FIG. 9), a shaft fixing member 170 is fixed, as will be described next.

Figure 15:
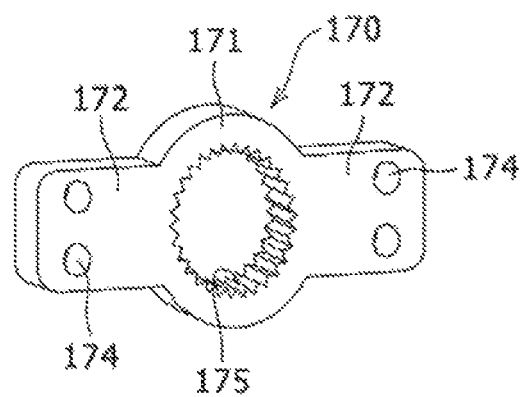
FIG. 15 is a perspective diagram showing a shaft fixing member in the structure of FIG. 12.

The shaft fixing member 170 has a shape shown in FIGS. 15 and 16, and includes a circular tube section 171, and a pair of arm sections 172 protruding from the circular tube section 171 on the side opposite in relation to the center axis of the circular tube section 171 toward the radially outer side. Each arm section 172 is formed in a flat plate shape, and has a through hole 174 on its tip. The shaft fixing member 170 causes the arm section 172 to be overlapped with each projection 166 of the fixed sheave 304, and thread-connects a bolt inserted to the through hole 174 with a tapped hole formed in each projection 166, so that the shaft fixing member 170 is fixed on the side opposite to the belt engagement surface of the fixed sheave 304 (front side of FIG. 16). The circular tube section 171 is fixed on the driven shaft 70 in a manner to not allow relative rotation by engagement of a spline groove 175 formed on an inner side of the circular tube section 171 and a spline groove formed on an outer circumferential surface of the driven shaft 70. At the portions inside of the through hole 174 which are not blocked by the shaft fixing member 170, the claw section 176 of the moveable sheave member 300 is provided therethrough, while allowing relative movement in the axial direction.

Referring again to FIG. 9, the drive pulley 20 includes a fixed sheave 178 integrally formed with the drive shaft 32, a moveable sheave 179 placed around the drive shaft 32 and moveable relatively in the axial direction with respect to the fixed sheave 178, a spring 180, a spider 181, a base member 182, and a flyweight mechanism 184. The fixed sheave 178 may be formed as a separate member from the drive shaft 32 and fixed on the drive shaft 32 by thread connection or the like.

The spider 181 is supported through thread connection on the drive shaft 32 in a manner to be not moveable in the axial direction and not relatively rotatable. The base member 182 is placed on the radially outer side of the drive shaft 32, is connected to the moveable sheave 179 through a connecting member 186, and is formed to move integrally with the moveable sheave 179.

In the spider 181 and the connecting member 186, engagement structures are provided, including a hole section or a groove section with which the moveable sheave 179 engages the spider 181 to synchronously rotate with the spider 181. The connecting member 186 engages the hole section or the groove section.

The spring 180 is provided between the drive shaft 32 and the base member 182, and urges the moveable sheave 179 in a direction away from the fixed sheave 178, via the base member 182.

The flyweight mechanism 184 includes a plurality of flyweights 188 having a blade shape and supported in a manner to allow rocking around an axis perpendicular to the radial direction at a side opposite to the belt engagement surface of the moveable sheave 179 and an engagement member 190 supported on the spider 181.

The flyweight mechanism 184 is opened so that the tip of the flyweight 188 is displaced to the radially outer side by an action of a centrifugal force when the rotational speed of the drive shaft 32 becomes high, and presses the engagement member 190 so that the moveable sheave 179 is displaced toward the fixed sheave 178 against the urging force of the spring 180 as a reaction.

A moveable sleeve 192 and a one-way clutch 194 are provided between the belt 24 and the drive shaft 32. The moveable sleeve 192 is supported to be relative moveable in the axial direction and rotatable with respect to the drive shaft 32.

Figure 17:
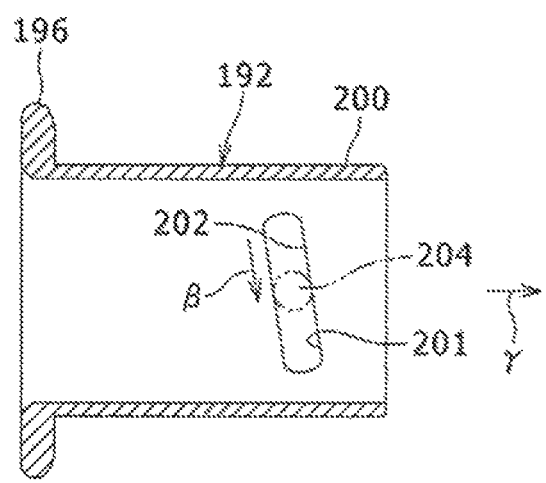
FIG. 17 is a cross sectional diagram showing a moveable sleeve and a cam mechanism placed on the drive pulley side in the first alternative configuration.

As shown in FIG. 17, the moveable sleeve 192 has a circular tube section 200 fitted and placed on the radially outer side of the drive shaft 32, a flange section 196 which protrudes to the radially outer side at an end on the side of the fixed sheave 178 on the circular tube section 200 (left side of FIG. 17), and a helical groove 202 formed to be inclined in the axial direction on the circular tube section 200.

Referring again to FIG. 9, the one-way clutch 194 is placed on the radially outer side of the circular tube section 200 of the moveable sleeve 192 in a contactable manner to the inner circumferential surface of the belt 24. The one-way clutch 194 is formed to transmit the rotational force in the forward rotational direction from the belt 24 to the moveable sleeve 192, but to not transmit the rotational force from the moveable sleeve 192 to the belt 24.

In addition, a cam mechanism 201 is provided between the moveable sleeve 192 and the drive shaft 32. As shown in FIG. 17, a cam mechanism 198 is formed by the helical groove 202 formed in the moveable sleeve 192 and a projection 204 projecting from and fixed on the outer circumferential surface of the drive shaft 32 and engaging the helical groove 202. The cam mechanism 198 moves the flange section 196 of the moveable sleeve 192 in the axial direction toward the side surface of the belt 24 (FIG. 9) when the moveable sleeve 192 is relatively rotated in the forward rotational direction with respect to the drive shaft 32. More specifically, with the relative rotation in the forward rotational direction of the moveable sleeve 192 with respect to the drive shaft 32, the helical groove 202 is relatively moved in the direction of an arrow β of FIG. 17 while being engaged with the projection 204. In this case, the moveable sleeve 192 is moved in the axial direction toward the side surface of the belt 24, which is a direction of an arrow γ in FIG. 17.

With the above-described structure, as will be described next, when the motive power source is an internal combustion engine, occurrence of a creep phenomenon, in which the rotational force is transmitted from the drive shaft 32 to the driven shaft 70 in an idle rotational state and the wheel is driven with a very small speed, can be prevented, and when the operation of the acceleration pedal is cancelled during the traveling of the vehicle, the engine brake can be effectively applied.

First, in the idle rotational state of the engine, the tip of the flyweight 188 of the flyweight mechanism 184 is displaced to the radially inner side. In this case, the inter-sheave distance becomes larger by the urging force of the spring 180 so that the belt 24 is not pinched between the fixed sheave 178 and the moveable sheave 179, and thus the inner circumferential surface of the belt 24 contacts an outer ring of the one-way clutch 194. In this state, the one-way clutch 194 does not transmit the motive power from the drive shaft 32 to the belt 24, and thus the occurrence of the creep phenomenon can be prevented.

On the other hand, when the output of the engine becomes larger and the rotational speed is increased, the tip of the flyweight 188 of the flyweight mechanism is displaced to the radially outer side. Thus, the inter-sheave distance becomes smaller against the urging force of the spring 180, the belt 24 is pinched between the fixed sheave 178 and the moveable sheave 179, the motive power is transmitted from the drive shaft 32 to the driven shaft 70, and the gear reduction ratio of the continuously variable transmission device 12 is also gradually reduced and the velocity of the wheel is gradually increased.

In cases where the engine brake is to be applied, such as when the vehicle is traveling downhill, the driver releases the acceleration pedal for deceleration. On the other hand, because the inertial force is transmitted from the wheel to the driven shaft 70, the driven shaft 70 is rotated at a higher speed than the drive shaft 32. In this case, because the tip of the flyweight 188 in the flyweight mechanism 184 is displaced to the radially inner side, the moveable sheave 179 is moved away from the fixed sheave 178 by the urging force of the spring 180.

In addition, the rotational force in the forward rotational direction is transmitted from the belt 24 to the outer ring of the one-way clutch 194, and the one-way clutch 194 transmits the motive power from the belt 24 to the moveable sleeve 192. In this case, the moveable sleeve 192 rotates relatively in the forward rotational direction with respect to the drive shaft 32, and thus the moveable sleeve 192 is moved by the cam mechanism 201 to the side of the moveable sheave 179, and the flange section 196 of the moveable sleeve 192 is moved toward and presses the side surface of the belt 24. In this state, the belt 24 is pinched between the flange section 196 and the moveable sheave 179, and the inertial force applied from the driven shaft 70 is transmitted and applied to the motive power source as a load. Therefore, the engine brake can be effectively applied.

In the case of the above-described structure also, similar to the structure of FIGS. 1-8, the inter-sheave distance at the driven pulley 22 can be arbitrarily set by control of the electric motor 92, and the gear reduction ratio can be arbitrarily set.

In addition, in the case of the present configuration, a section on the side of the second case element 134 of the actuator 26A is provided at a side opposite to the driven pulley 22 in relation to the axial direction, with respect to the output gear 98. Because of this, although, with the movement of the moveable sheave member 300, the section of the actuator 26A that is on the side of the second case element 134 is closer to the belt 24 and the side of the fixed sheave 304 compared to the structure of FIGS. 1-8, the interference of the actuator 26A and the belt 24 and the fixed sheave 304 can be effectively prevented and a compact structure can be realized.

Moreover, in the case of the present embodiment, the torque transmitting member 46 is placed on the moveable sheave member 300 on the side of the actuator 26A, and the claw section 176 which engages the torque transmitting member 46 is placed on the radially inner side of the fixed sheave 304. Because of this, the torque transmitting member 46 can be moved to pass the inside of the belt 24, and the size of the belt type continuously variable transmission device 12 can be further reduced. The other structures and operations are similar to those of the structure of FIGS. 1-8.

Figure 18:
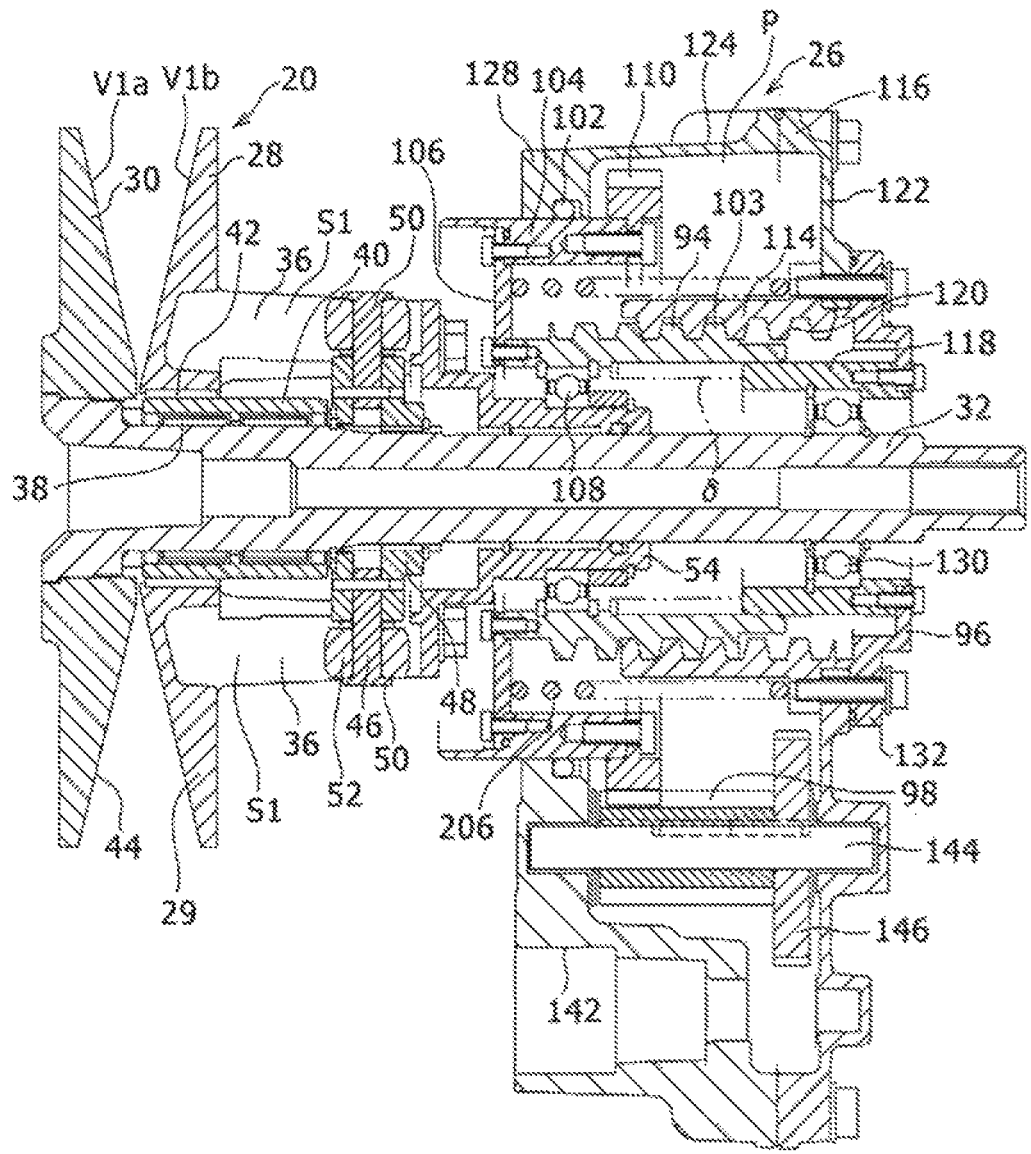
FIG. 18 is a diagram corresponding to FIG. 4 and showing a second alternative configuration of the embodiment of the present invention.

FIG. 18 is a diagram corresponding to FIG. 4 and showing a second alternative configuration of the embodiment of the present invention. In the case of the present configuration, in the above-described structure shown in FIGS. 1-8, an urging force generation member 206 is placed between the gear case 96 and the lid section 106 of the moveable feed member 94 at a radially outer side of the fixed tube section 114 and the inner tube section 103 inside the gear case 96. The urging force generation member 206 is formed by a coil spring, and urges the moveable feed member 94 to the side of the drive pulley 20 in relation to the axial direction.

In such a structure, with reference to FIG. 2, a pressing force is applied from the belt 24 to the moveable sheave member 28 in the drive pulley 20 to increase the inter-sheave distance, by the urging force of the spring 64 provided on the driven pulley 22. On the other hand, in the drive pulley 20, with the generation of the torque in the forward rotational direction of the electric motor 92, a force is applied to the moveable sheave member 28 to reduce the inter-sheave distance, against the urging force of the spring 64. In this case, in the structure of the present configuration, the torque of the electric motor 92 can be supplemented by the urging force of the urging force generation member 206, and the maximum value which is the peak of the required generation torque of the electric motor 92 can be reduced.

Figure 19:
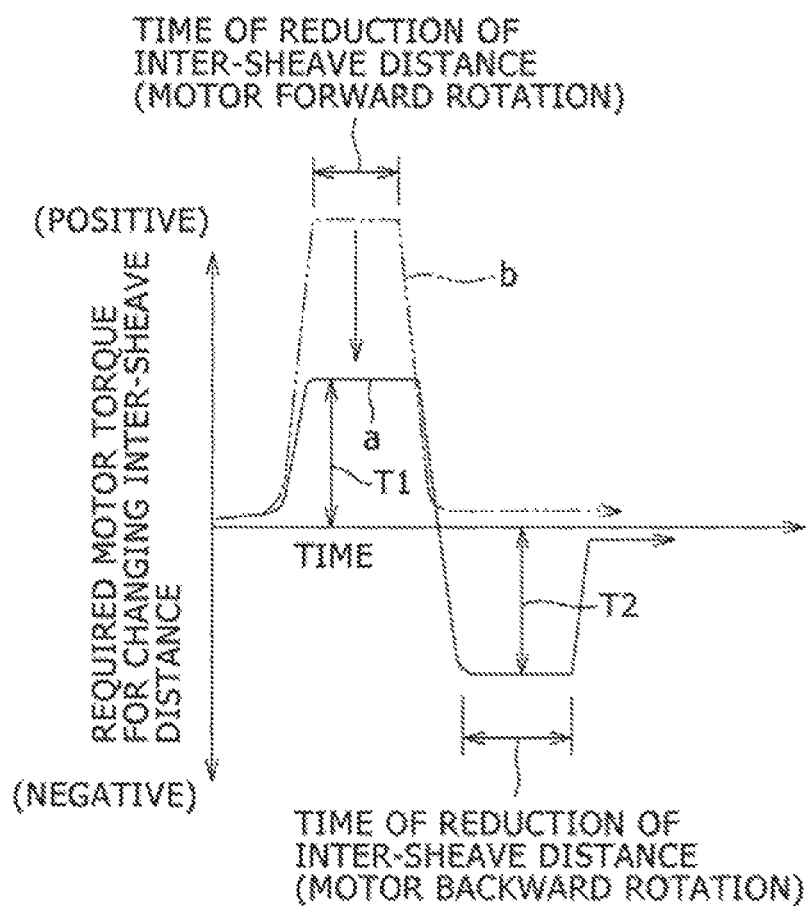
FIG. 19 is a diagram showing, in a comparison to a case in which there is no urging force generation member, a motor torque required for changing an inter-sheave distance in the drive pulley in the case in which the electric motor is rotated backward after being rotated in the forward direction in the second alternative configuration.

This point will be described in detail with reference to FIG. 19. FIG. 19 is a diagram showing a motor torque required for changing the inter-sheave distance in the drive pulley 20 in the case in which the electric motor 92 is to be rotated in a backward rotational direction after being rotated in the forward rotational direction in the second alternative configuration. FIG. 19 shows a case where the motor-side gear is operated with a certain constant load during the forward rotation and the backward rotation of the electric motor 92.

In the case of the present configuration shown by a solid line "a" in FIG. 19, during the forward rotation of the electric motor 92, the torque required for reducing the inter-sheave distance of the drive pulley 20 is T1 and small. This is because the urging force generation member 206 generates an urging force in a direction to press the moveable feed member 94 to the side of the drive pulley 20 and to move the moveable sheave member 28 toward the fixed sheave 30. A two-dots-and-chain line "b" of FIG. 10 shows a structure similar to the structure of the present configuration but with the urging force generation member 206 omitted, and the required torque during the forward rotation of the electric motor 92 is greater than that in the present configuration.

On the other hand, during the backward rotation of the electric motor 92, in the structure of the present configuration, the moveable feed member 94 must be displaced against the urging force of the urging force generation member 206, and the absolute amount of required torque of the electric motor 92 is T2 and is greater, but the difference in the absolute amount of required torque between the forward rotation and the backward rotation of the electric motor 92 can be reduced. Because of this, the maximum value of the required torque of the electric motor 92 over the both of rotations which are the forward rotation and the backward rotation can be reduced, the required capacity of the electric motor 92 can be reduced, and the size of the device can be reduced.

In addition, the urging force generation member 206 can be placed in the gear case 96 without increasing the size of the gear case 96, and thus the size of the actuator 26 is not excessively enlarged. Moreover, because the load variation between the forward rotation and the backward rotation during driving of the electric motor 92 can be reduced, the control can be simplified and controllability can be improved. The other structures and operations are similar to those of the structure shown in FIGS. 1-8.

In the structure of the present configuration, the urging force generation member 206 may alternatively be placed at a position in FIG. 18 shown by a two-dots-and-chain line δ. More specifically, the urging force generation member 206 may be placed between the gear case 96 and the fixed member fixed on the inner circumferential side of the inner tube section 103 at the radially inner side of the fixed tube section 114 and the inner tube section 103. The fixed member may be a locking member locked on a locking groove formed on the radially inner side of the inner tube section 103 or an outer ring of the bearing 108. In this case also, the maximum value of the required generation torque of the electric motor 92 can be reduced by the urging force generation member 206. Further, the urging force generation member 206 can be placed in the gear case 96 without increasing the size of the gear case 96.

Moreover, in the structure in which the actuator 26A is provided on the driven pulley 22, such as in the first alternative configuration shown in FIGS. 9-17, the urging force generation member 206 may be placed at a position similar to FIG. 18 or at a position similar to the two-dots-and-chain line δ of FIG. 18. In this case, in the driven pulley 22, due to the urging force generation member 206, the maximum value of the required generation torque of the electric motor 92 in the case when the moveable sheave member 300 is moved in the direction to increase the inter-sheave distance can be reduced.

Figure 20:
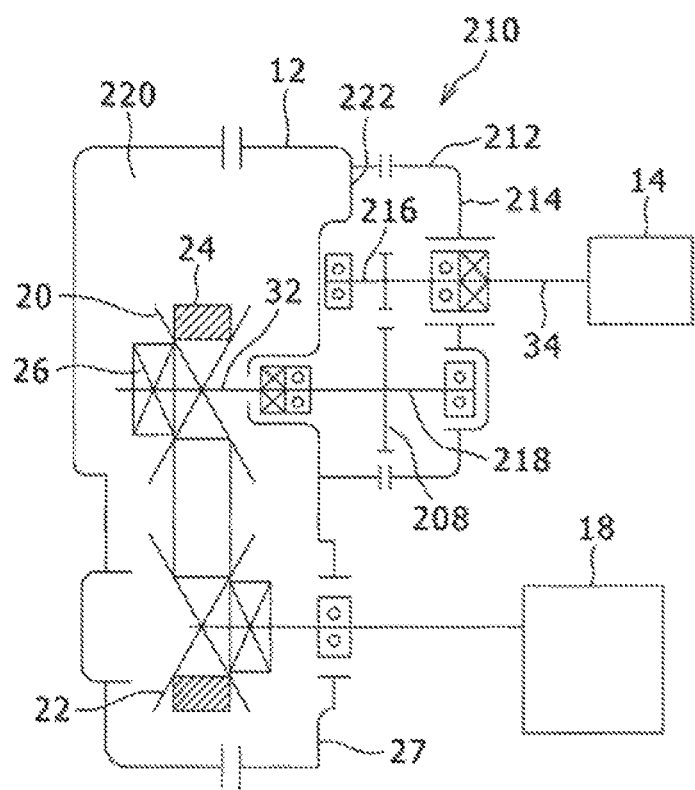
FIG. 20 is a diagram showing an integrated structure in which a gear reduction mechanism is integrated to the continuously variable transmission device of the embodiment of the present invention.

FIG. 20 is a diagram showing an integral structure 210 in which a gear reduction mechanism 208 is integrated to the continuously variable transmission device 12 of the embodiment of the present invention. In the case of the present configuration, the integral structure 210 includes a reduction gear unit 212 provided between the drive shaft 32 and the motive power source 14 and provided on the side of the drive shaft 32 of the continuously variable transmission device 12. The motive power source is, for example, an engine. Alternatively, an electric motor may be employed as the motive power source 14. The reduction gear unit 212 includes a reduction gear case 214 which is a reduction gear housing unit fixed on the gearbox case 27, and the gear reduction mechanism 208 housed in the reduction gear case 214. The gear reduction mechanism 208 has an input shaft 216 connected coaxially to the output shaft 34 of the motive power source 14, a small-size gear fixed on the input shaft 216, and a large-size gear fixed on a shaft section 218 which is integral with the drive shaft 32 placed in the reduction gear case 214, and which intermeshes with the small-size gear. Because the gear reduction mechanism 208 transmits the rotational force of the input shaft 216 to the shaft section 218 while reducing the rotational speed of the rotational force, the rotational force of the motive power source 14 is transmitted to the drive shaft 32 while reducing the rotational speed.

The reduction gear case 214 is fixed on the gearbox case 27 in a state where a wall section 222 is provided to separate a belt placement space 220 in which the belt 24 of the continuously variable transmission device 12 is placed. The gear reduction case 214 contains lubricant oil.

According to the above-described structure, the inside of the reduction gear case 214 can be set as a lubricated region and the inside of the gearbox case 27 can be set as a non-lubricated region. Because the rotational force of the output shaft 34 is transmitted to the drive shaft 32 while reducing the rotational speed of the rotational force by the gear reduction mechanism 208, even when the motive power source 14 is rotated at a high speed, the load of the bearing provided on the support section of the drive shaft 32 can be reduced, and the endurance can be improved. In addition, because the gearbox case 27 and the reduction gear case 214 are integrated, the number of components can be reduced and a size of a structure having a function to reduce the speed of the drive shaft 32 can be reduced.

Figure 21:
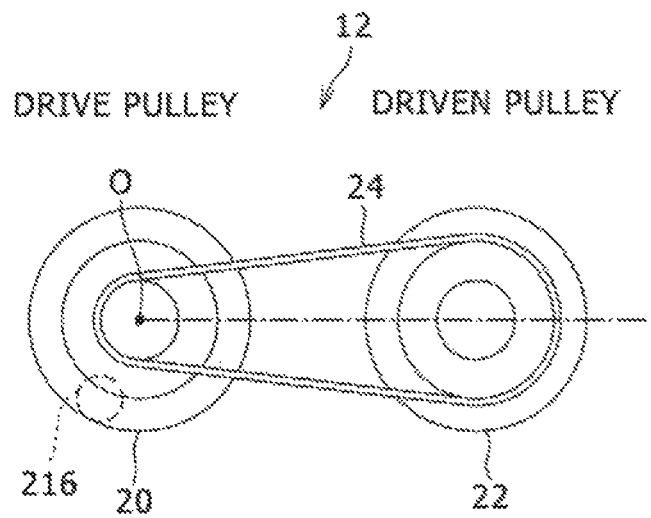
FIG. 21 is a schematic view showing a positional relationship between an input shaft to which an output shaft of the motive power source is connected and a center axis O of rotation of the drive pulley in the structure of FIG. 20.

In addition, as shown by a broken line in FIG. 21, an input shaft 216 to which the output shaft 34 of the motive power source 14 is connected may be placed at a position lower than the rotation center axis O of the drive pulley 20. In this case, because the input shaft 216 integrally rotates with the output shaft 34, the rotational speed is increased, but the lubricant oil introduced into the reduction gear case 214 of FIG. 20 tends to more easily be supplied to the input shaft 216 and the bearing which is the rotational support section of the input shaft 216. Because of this, the lifetime of the integrated structure 210 can be improved. In addition, because the gear reduction mechanism 208 is formed by a large gear and a small gear, the structure can be simplified, and various gear reduction ratios can be easily set. The gear reduction mechanism may be formed to have a gear reduction function of not only 1 stage, but of two or more stages. Alternatively, in place of the gear reduction mechanism, a reduction mechanism including a belt or a chain may be employed. The other structures and operations are similar to those of the structure shown in FIGS. 1-8. The structure of the present configuration may be combined with the structure shown in FIGS. 18 and 19.

Figure 22:
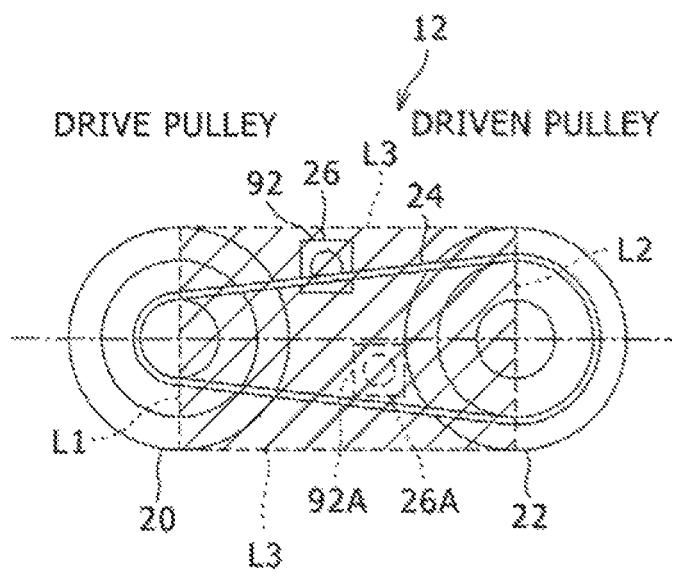
FIG. 22 is a schematic view showing a positional relationship between the drive and driven pulleys and the electric motor in a third alternative configuration of the embodiment of the present invention.

FIG. 22 is a schematic view showing positional relationships between the drive pulley 20 and the driven pulley 22, and the electric motor 92 in a third alternative configuration of the embodiment of the present invention. The continuously variable transmission device 12 of the present configuration is formed such that, in the structure of FIGS. 1-8 described above, when the drive pulley 20 and the driven pulley 22 are viewed in the axial direction, the electric motor 92 of the actuator 26 is placed within a rectangular region (region shown by slanted lines in FIG. 22) formed by a first straight line L1 and a second straight line L2 connecting maximum inscribed circles of the outer circumferential surfaces of the pulleys 20 and 22 a third straight line L3 connecting one end of the straight line L1 and one end of the straight line L2, and a fourth straight line L4 connecting the other ends of the two straight lines L1 and L2.

In the case of the present configuration, the size of the continuously variable transmission device 12 including the electric motor 92 can be reduced. In addition, because the shape of the gearbox case housing the continuously variable transmission device 12 can be set to a simple shape not significantly affected by the structure of the electric motor 92, the manufacturing cost can be reduced. Alternatively, the structure of the present configuration may be combined with any one of the structures of alternative configurations of FIGS. 9-21 described above.

As shown by an electric motor 92A with a broken line in FIG. 22, in any one of the above-described configurations, two actuators 26 and 26A may be provided for changing the inter-sheave distance on both of the drive pulley 20 and the driven pulley 22. In this case, when the pulleys 20 and 22 are viewed from the axial direction, electric motors 92 and 92A of the two actuators 26 and 26A may be placed in the above-described rectangular region. In this case, the inter-sheave distance can be arbitrarily controlled by controlling both the pulleys 20 and 22, and thus a finer control may be realized.

Figure 23:
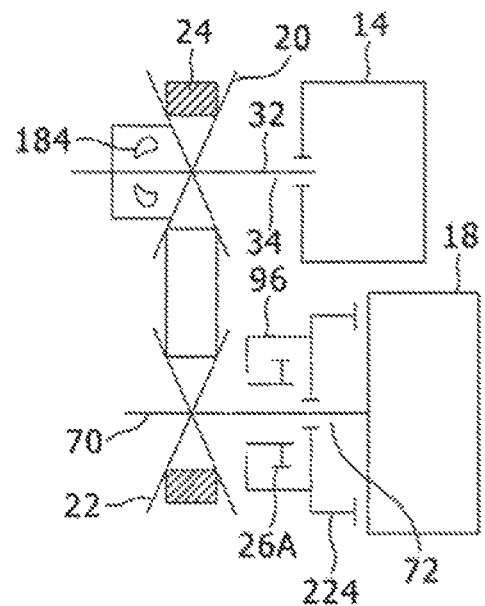
FIG. 23 is a schematic view showing a continuously variable transmission device in a fourth alternative configuration of the embodiment of the present invention.

FIG. 23 is a schematic view showing a continuously variable transmission device of a fourth alternative configuration of the embodiment of the present invention. In the case of the present configuration, in the structure shown in FIGS. 9-17, the gearbox case 27 is omitted, the actuator 26A is placed on the side of the gear transmission mechanism 18 in relation to the driven pulley 22, in relation to the axial direction of the driven pulley 22, and the gear case 96 of the actuator 26A is fixed on the case of the gear transmission mechanism 18 by a fixed stay 224. In this case, a degree of freedom of placement position of the fixed stay 224 can be improved, and the belt can be easily replaced without detaching the constituent components of the actuator 26A. Because of this, maintainability can be improved.

Figure 24:
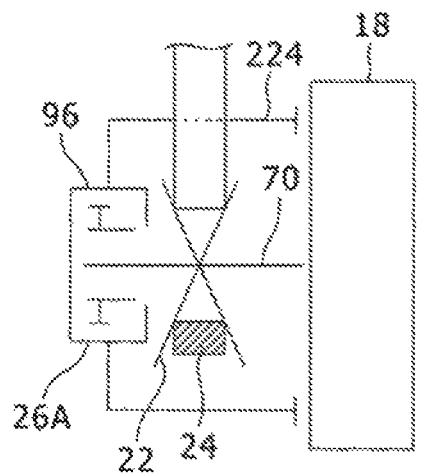
FIG. 24 is a schematic view showing a part of a continuously variable transmission device of a fifth alternative configuration of the embodiment of the present invention.

FIG. 24 is a schematic view showing a part of a continuously variable transmission device of a fifth alternative configuration of the embodiment of the present invention. In the case of the present configuration, in the structure of FIG. 23 described above, the actuator 26A is placed on the side opposite to the gear transmission mechanism 18 in relation to the driven pulley 22, in relation to the axial direction of the driven pulley 22, and the actuator 26A is fixed on the case of the gear transmission mechanism 18 by the fixed stay 224. In this case, the actuator 26A is placed on the same side as the flyweight mechanism 184 (refer to FIG. 23) of the drive pulley 20 in relation to the axial direction, and thus the size can be reduced.

Figure 25:
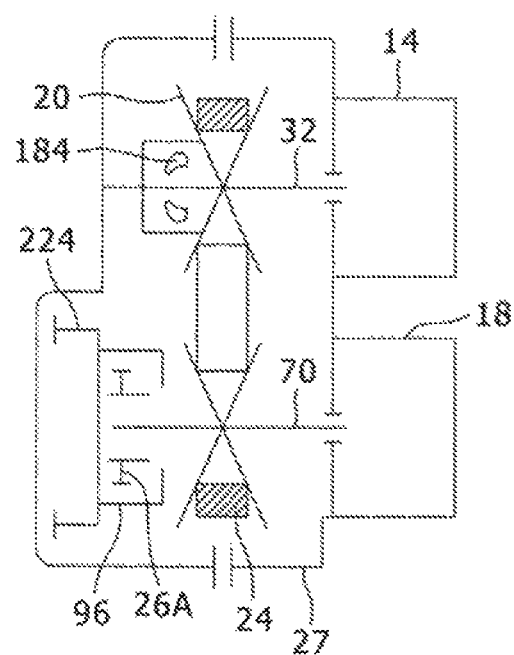
FIG. 25 is a schematic view of a continuously variable transmission device of a sixth alternative configuration of the embodiment of the present invention.

FIG. 25 is a schematic view of a continuously variable transmission device of a sixth alternative configuration of the embodiment of the present invention. In the case of the present configuration, in the structure of FIGS. 9-17 described above, in the gear case 96 of the actuator 26A, the fixed stay 224 is fixed on a side opposite of the gear transmission mechanism 18 in relation to the axial direction. In addition, the actuator 26A is fixed by the fixed stay 224 on the inner side surface of the gearbox case 27 on a side opposite of the gear transmission mechanism 18 in relation to the axial direction. In this case, it becomes unnecessary for the fixed stay 224 to be provided through the inside of the belt 24.

Figure 26:
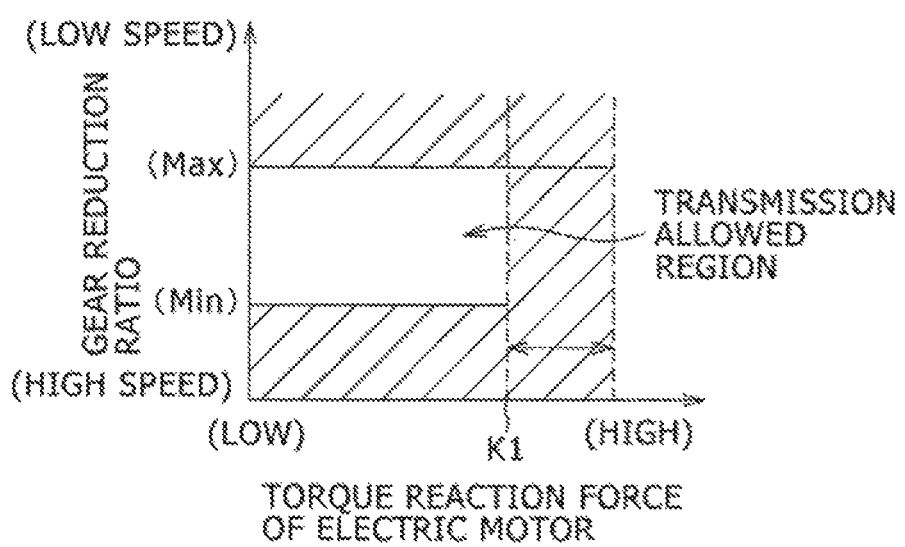
FIG. 26 is a diagram showing a relationship between a torque reaction force of the electric motor and a gear reduction ratio of the continuously variable transmission device in a seventh alternative configuration of the embodiment of the present invention.

FIG. 26 is a diagram showing a relationship between a torque reaction force of the electric motor 92 and the gear reduction ratio of the continuously variable transmission device 12 in a seventh alternative configuration of the embodiment of the present invention. In the structure of the present configuration, in the structure of FIGS. 9-17 described above, the controller (not shown) controls the driving of the electric motor 92 such that a sheave spacing maintaining function is provided by the torque of the electric motor 92. In addition, a pitch of the feed screw mechanism formed by the inner tube section 103 and the fixed tube section 114 provided on the side of the driven pulley 22 is set larger, so that the sheave spacing is not maintained by the screw engagement. In addition, a current sensor (not shown) for detecting a drive current of the electric motor 92 is provided.

The controller also calculates a required torque of the electric motor 92 for maintaining the sheave position at a constant position in a state of a constant gear reduction ratio, based on the detected value of the drive current. The controller also controls the driving of the electric motor 92 to generate the required torque. The controller further applies, when the required torque of the electric motor 92 exceeds a predetermined value K1 which is set in advance, a special control different from the normal control to be executed using the control map or the like, to control the driving of the electric motor 92 to increase the gear reduction ratio of the continuously variable transmission device 12 according to the increase in the required torque.

With such a configuration, the tension applied on the belt 24 can be estimated based on the calculated value of the required torque of the electric motor 92 for maintaining the constant sheave position. In addition, when the required torque exceeds the predetermined value K1, the gear reduction ratio of the continuously variable transmission device 12 is increased. In this case, it can be judged that an excessive load is applied on the motive power source, and thus the excessive load state can be avoided by increasing the gear reduction ratio.

Figure 27:
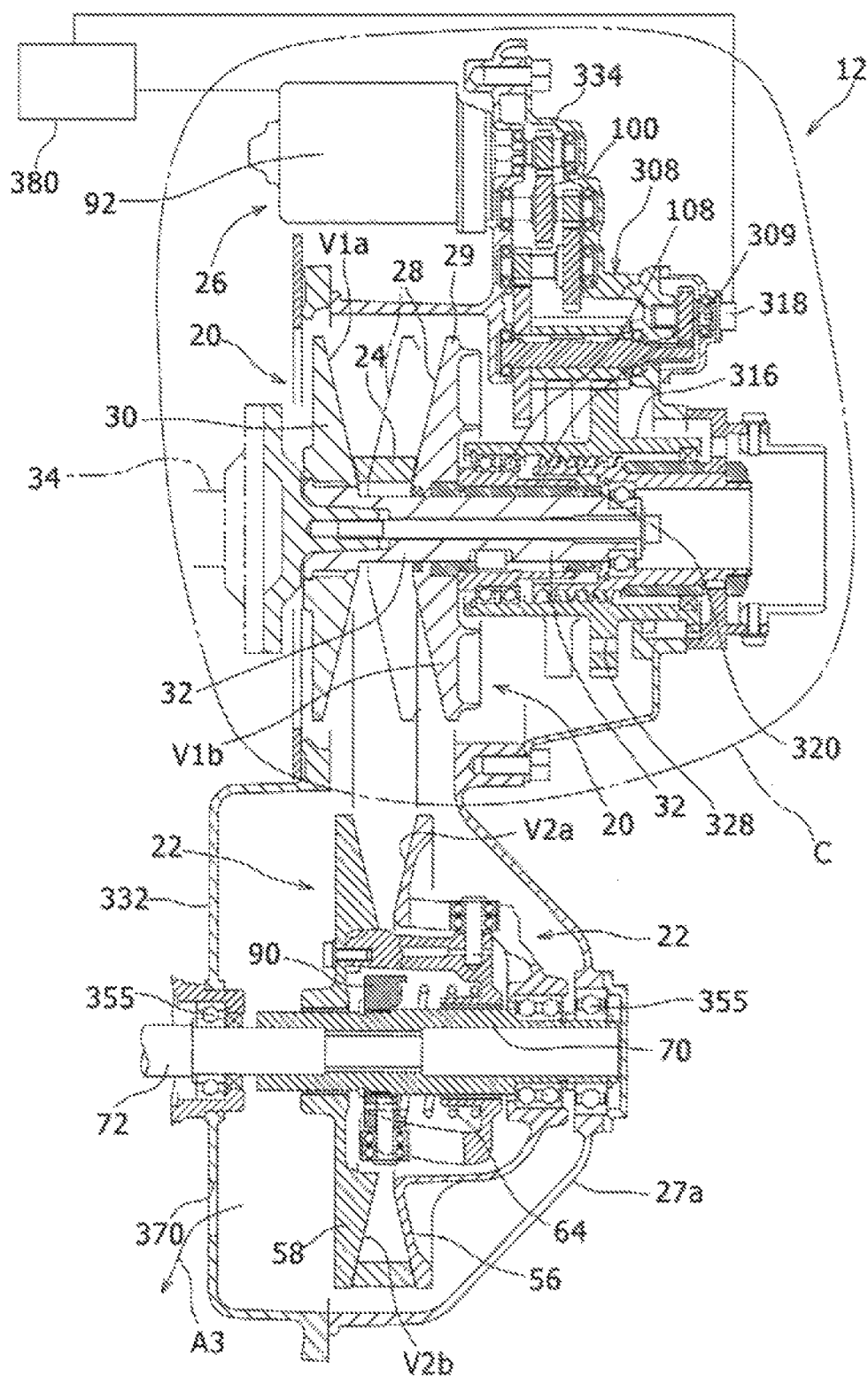
FIG. 27 is a diagram corresponding to FIG. 2, and shows another alternative configuration of the embodiment of the present invention.
Figure 28:
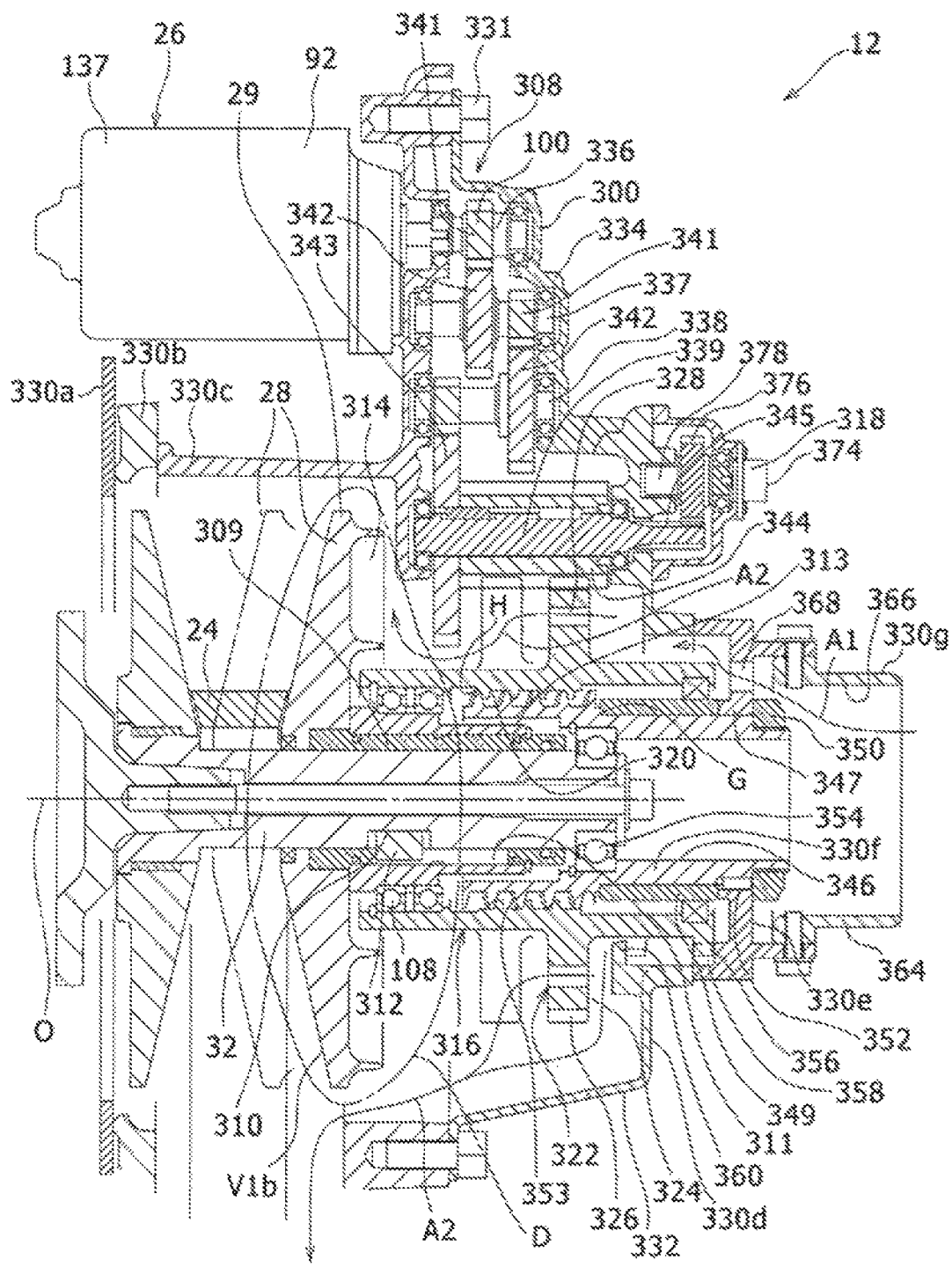
FIG. 28 is an enlarged view of a C-part of FIG. 27.
Figure 29:
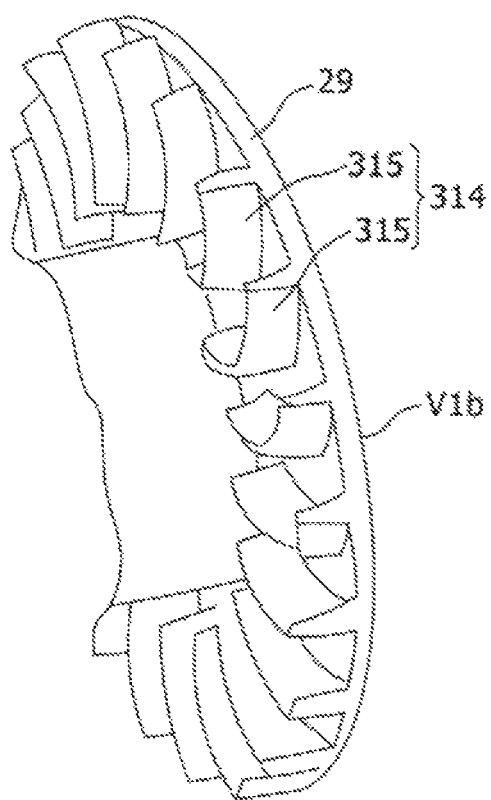
FIG. 29 is a diagram showing a D-part of FIG. 28 from a diagonally upward direction.

FIG. 27 is a diagram corresponding to FIG. 2, and shows another configuration of the embodiment of the present invention. FIG. 28 is an enlarged view of a C-part of FIG. 27. FIG. 29 is a diagram of a D-part of FIG. 28, viewed from a diagonally upward direction. In the case of the present configuration, in the structure shown in FIGS. 1-8, a gear case 308 houses and supports the gear mechanism for transmitting the motive power of the electric motor 92 to the moveable sheave member 28, houses the drive pulley 20 and the driven pulley 22, and has a function of the gearbox case.

More specifically, the belt type continuously variable transmission device 12 comprises the drive pulley 20, the driven pulley 22, the belt 24, and the actuator 26. The drive pulley 20 comprises the fixed sheave 30 and the moveable sheave member 28.

The moveable sheave member 28 which is a part of the drive pulley 20 has the moveable sheave body 29 having the belt engagement surface V1b which engages with the belt 24, and a moveable tube section 309 provided to protrude in the axial direction toward an end on the inner circumferential side which is the opposite side from the belt engagement surface V1b of the moveable sheave member 29 in relation to the axial direction. Unlike the structure shown in FIGS. 1-8, no claw section 36 is provided on the moveable sheave body 29. In addition, the torque transmission member 46 (FIG. 4) is not provided between the moveable sheave member 28 and the drive shaft 32. In the case of the present configuration, a circular tube-shaped fitting hole is formed on the inner circumferential surface on the end of the moveable sheave body 29 on the side opposite to the belt engagement surface V1b, and one end in the axial direction (left end of FIG. 28) of the moveable tube section 309 is fitted and fixed on the fitting hole by welding or the like. The moveable tube section 309 is fitted in a slidable manner on the outer circumferential side of the drive shaft 32. The inner circumferential surface of the moveable sheave body 29 may oppose the outer circumferential surface of the drive shaft 32 with a gap therebetween. A slide bearing may be provided between the moveable sheave body 29 and the drive shaft 32.

A key 312 engages with an inner key groove 310 provided on a part in a circumferential direction on the outer circumferential surface of the drive shaft 32 and an outer key groove 311 formed penetrating in the radial direction at a part in the circumferential direction of the moveable tube section 309. The outer key groove 311 is longer than the inner key groove 310. With this configuration, torque can be transmitted between the moveable sheave member 28 and the drive shaft 32. In addition, a bearing support tube member 313 is supported on the outer circumferential side of the moveable tube section 309 in a state where the movement in the axial direction with respect to the moveable sheave member 28 is blocked.

As shown in FIG. 29, the moveable sheave body 29 has a suction fan unit 314 provided on a surface on the opposite side from the belt engagement surface V1b in relation to the axial direction. The suction fan unit 314 is formed by a plurality of blades 315 provided to protrude on a surface on the side opposite to the belt engagement surface V1b of the moveable sheave body 29. When the moveable sheave body 29 rotates, the suction fan unit 314 sucks air in the axial direction and sends out the air from the outer circumferential side between adjacent blades 315 so that the air is moved toward the outer circumferential side.

Referring again to FIG. 28, the actuator 26 comprises a moveable feed screw member 316, the electric motor 92 which rotationally drives the moveable feed screw member 316 via the gear mechanism 100, a gear case 308, and a rotational angle sensor 318. The moveable feed screw member 316 is supported on the outer circumferential side of the moveable tube section 309 in a state where movement in the axial direction with respect to the moveable sheave member 28 is blocked, and in a manner to be rotatable with respect to a central axis O which is the center of the rotational shaft, via the bearing support tube member 313 and 2 rows of bearings 108.

The moveable feed screw member 316 comprises a moveable-side feed screw 320 provided on an intermediate section in the axial direction, which is a position different from the bearing 108 in the axial direction on the inner circumferential surface, and an outer gear 322 provided on the outer circumferential surface. At least a part of the moveable-side feed screw 320 is at a same position as the bearing 108 in the radial direction of the drive shaft 32. In this case, at least a part of the moveable-side feed screw 320 and the bearing 108 are on the same circumference centered at the central axis O of the drive shaft 32. With such a structure, the size of the feed screw mechanism can be reduced, as will be described below. The bearing 108 is placed, in the axial direction, between a moveable sheave body-side end H of the moveable-side feed screw 320 and the moveable sheave body 29. The outer gear 322 comprises a circular disc portion 324 protruding in the intermediate portion in the axial direction on the outer circumferential surface of the moveable feed screw member 316, and a gear body 326 provided on the outer circumferential surface of the circular disc portion 324. The circular disc portion 324 has a plurality of holes 328 penetrating through in the axial direction.

The gear case 308 is integrally formed by coupling and fixing a plurality of case elements 330a, 330b, 330c, 330d, 330e, 330f, and 330g with a bolt 331 or with a nut 350 as will be described later, and comprises a body section 332 and a protruding section 334 protruding from a part of the body section 332 on an opposite side from the driven pulley 22 with respect to the drive shaft 32. The gear mechanism 100 is placed at an inner side of the protruding section 334 and the part of the body section 332. A side surface of the case element 330a contacts a crank case of the engine (not shown), and is fixed by a bolt (not shown). A motor case 137 of the electric motor 92 is fixed on the outer surface of the protruding section 334 on the engine side (left side in FIG. 27). The gear mechanism 100 comprises a plurality of gear shafts 336, 337, 338, and 339 including the gear shaft 336 linked to the rotational shaft of the electric motor 92, and gears 341, 342, 343, and 344 fixed on the gear shafts 336, 337, 338, and 339. The gear shafts 336, 337, 338, and 339 are rotatably supported on the gear case 308. Of the gears 343 and 344 fixed on the gear shaft 339, the outer gear 322 intermeshes with the gear 344 having a small diameter. A gear 345 is formed on an outer circumferential surface on one end (right end of FIG. 28) of the gear shaft 339. In FIGS. 27 and 28, a part in the circumferential direction of the right end of the electric motor 92 is not shown.

The body section 332 which is a part of the gear case 308 comprises an inner fixed tube section 346 protruding on the side of the drive shaft 32, and an outer fixed tube section 364 having a larger inner diameter than an outer diameter of the inner fixed tube section 346 and protruding toward the outer side on the side opposite to the inner fixed tube section 346. The inner fixed tube section 346 is provided by inserting and fixing a tubular case element 330f into a hole 347 formed on the case element 330e. In this case, the nut 350 is coupled to a portion protruding positioned at the outer side than the case element 330e at the case element 330f in a state where a tubular spacer 349 is sandwiched between a step surface G provided at a portion distanced from a fixed-side feed screw 353 to be described later and the case element 330e. The nut 350 is pressed against the case element 330e so that the case element 330f is fixed on the case element 330e. A key 352 engages with a key groove formed on the outer circumferential surface of the case element 330f and a key groove formed on the inner circumferential surface of the hole 347 of the case element 330e, so that rotation of the case element 330f with respect to the case element 330e is blocked.

The inner fixed tube section 346 comprises the fixed-side feed screw 353 provided on the outer circumferential surface on one end side in the axial direction (left end side in FIGS. 27 and 28), and the fixed-side feed screw 353 screw-engages with the moveable-side feed screw 320 of the moveable feed screw member 316. A bearing 354 is provided between the inner circumferential surface of the inner fixed tube section 346 and the outer circumferential surface on one end in the axial direction of the drive shaft 32. With such a configuration, the one end in the axial direction of the drive shaft 32 is rotatably supported on the inner fixed tube section 346. The outer fixed tube section 364 will be described later.

As shown in FIG. 27, on 2 locations of the body section 332 on the side of the driven pulley 22, 2 locations in the axial direction of the driven shaft 70 are rotatably supported via the bearing 355.

As shown in FIG. 28, at a part, in the circumferential direction, of the outer circumferential surface of one end in the axial direction (right end in FIG. 28) of the moveable feed screw member 316, a protrusion 356 protruding toward the outer circumferential side is formed. In a state where the moveable feed screw member 316 is moved at the one side in the axial direction (right side in FIG. 28), a first stopper 358 having a groove shape formed in the circumferential direction is provided at a portion, on the inner circumferential surface of the case element 330e, opposing one end in the axial direction (right end of FIG. 28) and one side surface in the circumferential direction (back side surface of FIG. 28) of the protrusion 356. In a state where the moveable feed screw member 316 is moved to the other side in the axial direction (left side of FIG. 28), a second stopper 360 which protrudes toward the outer circumferential surface of the moveable feed screw member 316 is provided at a portion, on the inner surface of the case element 330d fixed on the case element 330e, opposing the other end in the axial direction (left end in FIG. 28) of the protrusion 356. With this configuration, the moveable feed screw member 316 can be rotated within a predetermined range from a position where the protrusion 356 is in contact with the first stopper 358 to a position where the protrusion 356 is in contact with the second stopper 360. With this configuration, it becomes possible for the moveable feed screw member 316 to move in the axial direction within a predetermined range while being rotated, in a state where the fixed-side feed screw 353 is screw-engaged with the moveable-side feed screw 320.

The outer fixed tube section 364 is formed with the case element 330e, and the case element 330g having a tubular shape and coupled and fixed on the case element 330e. Air intake ports 366 and 368 are formed on the inner side of the outer fixed tube section 364 and a portion on the wall of the case element 330e positioned at a deeper side of the outer fixed tube section 364. As shown in FIG. 27, in the body section 332, an air discharge port 370 is formed at a portion where the driven pulley 22 is positioned at the inner side. The air intake ports 366 and 368 are used for taking in the air which is the outside air from the outside of the gear case 308 to the inside thereof, as shown by an arrow A1 of FIG. 28. The air discharge port 370 is used for discharging the taken-in air from the side of the driven pulley 22 to the outside of the gear case 308.

A rotational angle sensor 318 comprises a sensor body 374 mounted on the gear case 308, and a sensor shaft 378 which is rotatably supported on the gear case 308 and on which a sensor gear 376 is fixed. The sensor shaft 378 intermeshes with the gear 345 at one end of the gear shaft 339. The sensor body 374 detects a change of the rotational angle of the end of the sensor shaft 378, to detect a change of the rotational angle of the gear shaft 339. For example, a magnetic characteristic of the outer circumferential surface of the sensor shaft 378 may change in an alternating manner in the circumferential direction, and the sensor body 374 detects an amount of change of the rotational angle by detecting a change of the magnetic characteristic. A signal indicating the detected value of the rotational angle sensor 318 is transmitted to a controller 380 (FIG. 27). The controller 380 calculates an amount of change of the rotational angle of the outer gear 322 which intermeshes with the gear 344, based on the detected value of the amount of change of the rotational angle of the gear shaft 339, and calculates an amount of movement in the axial direction of the moveable sheave member 28 based on the calculated amount of change of the rotational angle. With this configuration, the controller 380 can determine the position in the axial direction of the moveable sheave member 28 based on the amount of change of the rotational angle of the gear shaft 339, by storing, in advance, the rotational angle of the gear shaft 339 corresponding to a predetermined position in the axial direction of the moveable sheave member 28.

According to the above-described configuration, the moveable feed screw member 316 is supported on the outer circumferential side of the moveable tube section 309 of the moveable sheave member 28 via the bearing 108, and at least a part of the moveable-side feed screw 320 is at a same position as the bearing 108 in the radial direction of the drive shaft 32. Because of this, the diameter of the moveable-side feed screw 320 can be made smaller. As a consequence, a size of the feed screw mechanism formed by the moveable feed screw member 316 having the moveable-side feed screw 320 and the inner fixed tube section 346 having the fixed-side feed screw 353 can be reduced.

In addition, by the suction fan unit 314 of the moveable sheave member 28 being rotated during the rotation of the drive shaft 32, the air taken in from the outside of the gear case 308 to the inside thereof through the air intake ports 366 and 368 as shown by the arrow A1 of FIG. 28 is taken into the side of the moveable sheave body 29 through the hole 328 of the circular disc portion 324 in the gear case 308 as shown by an arrow A2, or through a gap between the circular disc portion 324 and the gear case 308. The air flows toward the outer side in a radial direction at a periphery of the suction fan unit 314 and then flows to the side of the driven pulley 22, and is discharged from the air discharge port 370 as shown by an arrow A3 (FIG. 27). Because of this, friction sections between the drive pulley 20 and the belt 24 and between the driven pulley 22 and the belt 24 can be efficiently cooled. The other structures and operations are similar to those of the structure shown in FIGS. 1-8.

Figure 30:
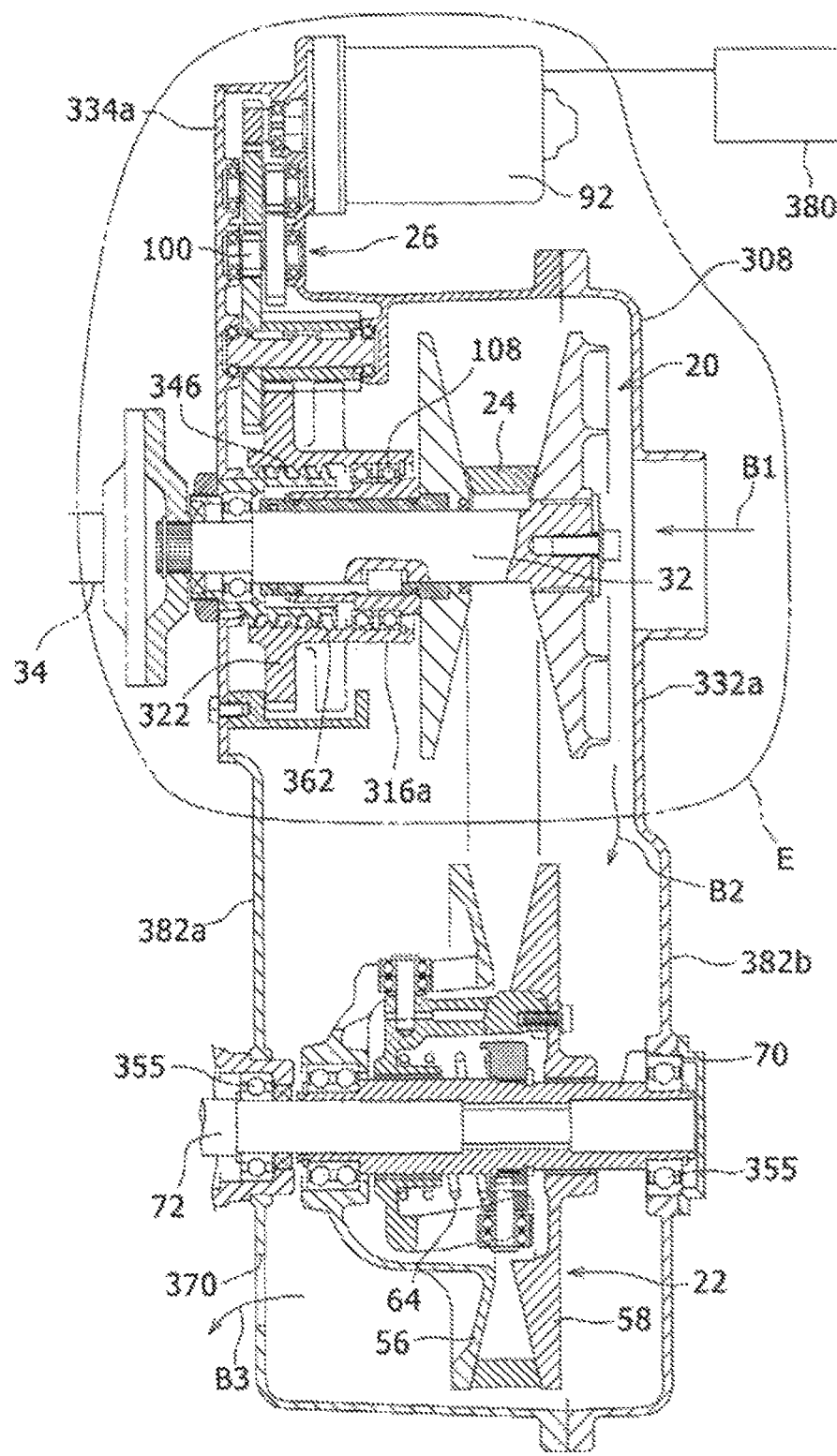
FIG. 30 is a diagram corresponding to FIG. 2, and shows another alternative configuration of the embodiment of the present invention.
Figure 31:
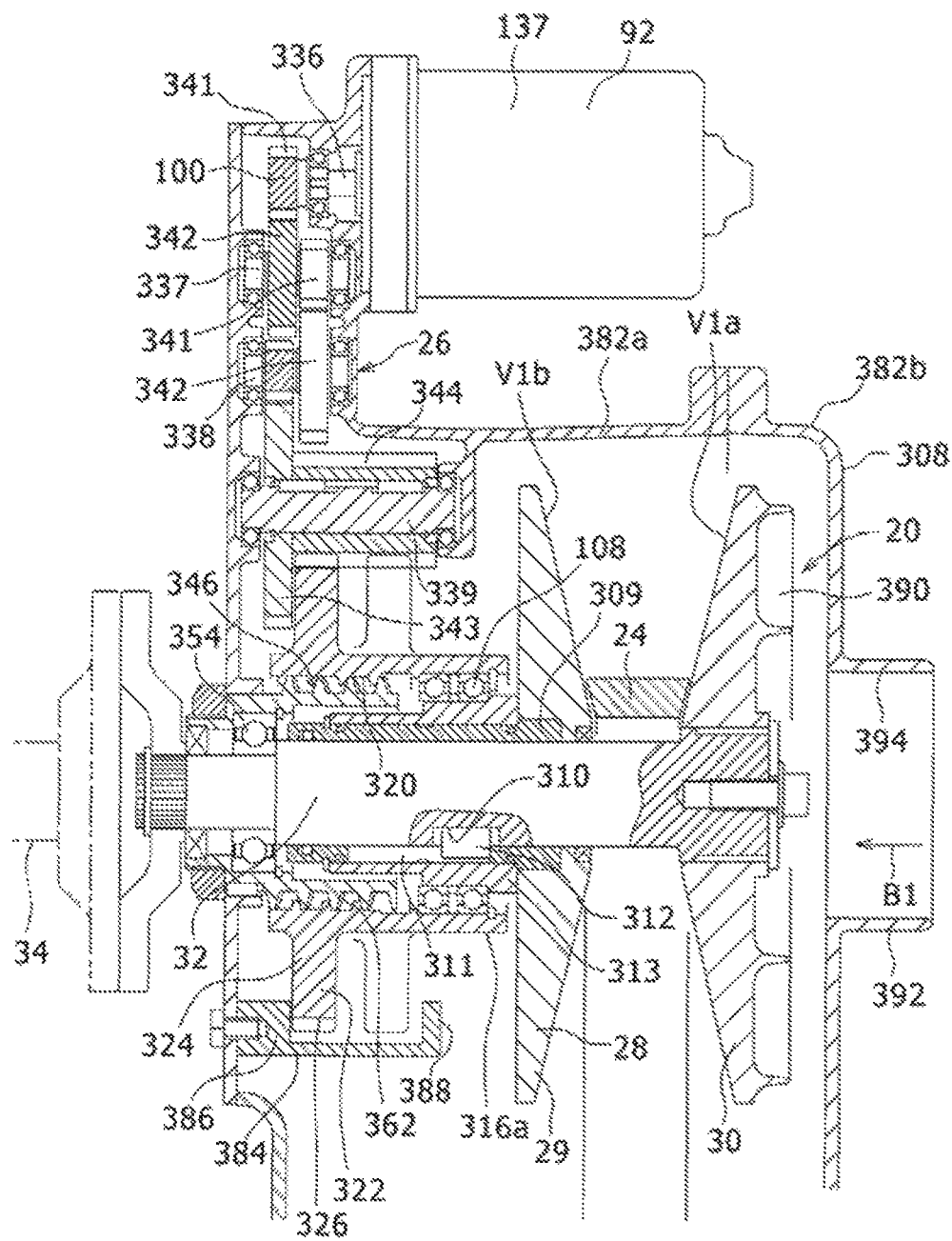
FIG. 31 is an enlarged view of an E-part of FIG. 30.

FIG. 30 is a diagram corresponding to FIG. 2 and showing another configuration of the embodiment of the present invention. FIG. 31 is an enlarged view of an E-part of FIG. 30. In the case of the present configuration, in the structure shown in FIGS. 27-29, the gear mechanism 100, the moveable feed screw member 316a having the outer gear 322, the inner fixed tube section 346 having the fixed-side feed screw 362, and the bearing 108 are positioned on a side nearer to the engine (left side of FIG. 30) than the engagement sections between the drive pulley 20 and the belt 24 and between the driven pulley 22 and the belt 24.

More specifically, the gear case 308 is formed by coupling a plurality of case elements 382a and 382b with a bolt (not shown), and a protrusion 334a of the gear case 308 is provided on a side of the engine with respect to the body section 332a. The motor case 137 is fixed on a surface of the protrusion 334a on the side opposite to the engine (right side surface of FIG. 31). The fixed sheave 30 is fixed on one end of the drive shaft 32 (right end of FIG. 31), and the other end of the drive shaft 32 is rotatably supported by the bearing 354 on the inner fixed tube section 346 provided on the gear case 308. As shown in FIG. 30, the positional relationship in the axial direction between the fixed sheave 56 and the moveable sheave 58 of the driven pulley 22 is opposite to that in the structure shown in FIGS. 27-29.

On the inner surface of the gear case 308, a stopper member 384 for regulating the movement in the axial direction of the outer gear 322 is fixed. In the stopper member 384, an L-shaped protrusion 388 protrudes from a side surface of a base 386 having a rectangular parallelepiped shape fixed on the gear case 308. Both side surfaces in an axial direction of the outer circumferential section of the outer gear 322 oppose the inner surfaces of the base 386 and a tip of the protrusion 388. The outer gear 322 can be moved in the axial direction within a predetermined range until the outer gear 322 is in contact with the base 386 or the tip of the protrusion 388.

The fixed sheave 30 comprises a suction fan unit 390 which is provided on a side opposite to the belt engagement surface V1a in relation to the axial direction and which takes in the air in the axial direction and sends out the air toward the outer circumferential side when the fixed sheave 30 is rotated. The gear case 308 has a tube section 392 which protrudes toward the outer side at a periphery of a portion opposing one end of the drive shaft 32, and an air intake port 394 is formed on an inner side of the tube section 392. An air discharge port 370 for discharging air from the inside is formed on the gear case 308 at the side of the driven pulley 22.

The air taken in from the outside of the gear case 308 to the inside thereof through the air intake port 394 as shown by an arrow B1 by the suction fan unit 390 of the fixed sheave 30 being rotated during rotation of the drive shaft 32 flows in the gear case 308 in a flow as shown by an arrow B2, and is then discharged from the air discharge port 370 as shown by a narrow B3. Because of this, friction sections between the drive pulley 20 and the belt 24 and between the driven pulley 22 and the belt 24 can be efficiently cooled. The other structures and operations are similar to those of the structure shown in FIGS. 27-29.

Although not shown, in the structure shown in FIGS. 30 and 31, an optical sensor or an ultrasound sensor which measures a distance to one surface in the axial direction may be mounted on the gear case 308 at a portion opposing the one surface in the axial direction (left side surface of FIG. 30) of the outer gear 322. A signal indicating the detected value of the optical sensor or the ultrasound sensor is transmitted to the controller 380, and the controller 380 can determine a position in the axial direction of the moveable feed screw member 316a based on the signal. With this configuration, the position in the axial direction of the moveable sheave member 38 can be detected.

In the structures of FIGS. 27-31, the actuator 26 may alternatively be provided on the side of the driven pulley 22. In this case, similar to the structure shown in FIGS. 23 and 24, the gear case 308 and the gear transmission mechanism 18 may be fixed by a stay. Alternatively, similar to the structure shown in FIG. 18, an urging force generation member 206 may be provided between the bearing 108 and the inner fixed tube section 346. Alternatively, similar to the structure shown in FIG. 20, a gear reduction mechanism may be provided between the output shaft of the motive power source and the drive shaft 32, and the case which is a part of the gear reduction mechanism may be fixed on the gear case 308. Alternatively, similar to the structure shown in FIG. 26, a configuration may be employed in which the gear reduction ratio of the continuously variable transmission device 12 is increased when the necessary torque of the electric motor 92 exceeds a predetermined value.

The structure of the continuously variable transmission device is not limited to the above-described structures of the above-described configurations, and various structures may be employed within the scope and spirit of the present invention. For example, a configuration may be employed in which, on one pulley 20 (or 22) of the drive pulley 20 and the driven pulley 22, the belt 24 is pinched by two fixed sheaves in which the inter-sheave distance does not change.

The belt type continuously variable transmission device of at least one of the above-described configurations has the structure of the belt type continuously variable transmission device according to the first aspect of the present invention. Because of this, the outer gear of the moveable feed member is housed by the outer cover of the gear case, and the opening formed on the gear case proximately opposes the outer circumferential surface on the side of the one-side pulley in relation to the outer gear, in relation to the axial direction of the rotational shaft in the outer tube section of the moveable feed member. Because of this, the endurance of the gear in the structure which transmits the rotational force from the electric motor to the member having the feed screw can be improved.

The belt type continuously variable transmission device of at least one of the above-described configurations has the structure of the belt type continuously variable transmission device according to the second aspect of the present invention. Therefore, the assembling work can be facilitated without reducing the endurance of the gear.

The belt type continuously variable transmission device of at least one of the above-described configurations has the structure of the belt type continuously variable transmission device according to the third aspect of the present invention. Because of this, the moveable feed screw member is supported on the outer circumferential side of the moveable tube section of the moveable sheave member via the bearing, and at least a part of the moveable feed screw is at the same position as the bearing in the radial direction of the rotational shaft. Because of this, the diameter of the moveable feed screw can be made small, and as a consequence, the size of the feed screw mechanism can be reduced.

What is claimed is:

1. A belt type continuously variable transmission device comprising:
   a one-side pulley;
   an other-side pulley;
   a belt wound around the one-side pulley and the other-side pulley; and
   an actuator,
   the one-side pulley including a moveable sheave member placed to be moveable relatively in an axial direction with respect to a fixed sheave fixed on a rotational shaft and that pinches the belt between the moveable sheave member and the fixed sheave, and
   the actuator moving the moveable sheave member in the axial direction, wherein
   the actuator comprises:
   a moveable feed member having an inner tube section supported to be rotatable around a center of the rotational shaft on a radially outer side of the moveable sheave member and in which a moveable-side feed screw is provided, an outer tube section placed around the inner tube section and in which an outer gear is provided on a radially outer side; and a lid section that connects the inner tube section and the outer tube section;
   a gear case having a fixed tube section in which a fixed-side feed screw that screw-engages the moveable-side feed screw is provided, and an outer cover integrally provided on the fixed tube section, in which an opening into which the outer tube section of the moveable feed member is inserted is formed; and that houses the outer gear; and
   an electric motor that drives a motor-side gear that intermeshes with the outer gear, and
   an inner circumferential surface of the opening proximately opposes an outer circumferential surface on the side of the one-side pulley in relation to the outer gear on the outer tube section of the moveable feed member, in relation to the axial direction of the rotational shaft.

2. The belt type continuously variable transmission device according to claim 1, wherein
   the one-side pulley is a drive pulley on a motive power source side.

3. The belt type continuously variable transmission device according to claim 2, further comprising:
   a sealing member that is locked with one of an outer circumferential surface on the outer tube section on the side of the one-side pulley in relation to the outer gear in relation to the axial direction of the rotational shaft and the inner circumferential surface of the opening, and slides and contacts the other of the outer circumferential surface of the outer tube section and the inner circumferential surface of the opening.

4. The belt type continuously variable transmission device according to claim 2, wherein
   the fixed tube section is provided on a radially outer side of the inner tube section,
   the gear case includes a second fixed tube section provided concentrically with the fixed tube section on a radially inner side of the fixed tube section and having a support section which supports a bearing between the second fixed tube section and the rotational shaft on the side of the inner circumferential surface, and
   the second fixed tube section contacts or opposes the inner circumferential surface of the inner tube section, with a small gap there between, over the entirety of a moveable range of the inner tube section in the axial direction.

5. The belt type continuously variable transmission device according to claim 2, further comprising
   a torque transmitting member having a shaft fixing section fixed on a radially outer side of the rotational shaft, a support shaft protruding to a radially outer side of the shaft fixing section, and a roller rotatably supported on the support shaft, wherein
   the moveable sheave member includes a plurality of claw sections placed around the rotational shaft, that protrude to the side of the actuator, and that guide the roller between inner surfaces in a circumferential direction that oppose each other, and
   during rotation of the rotational shaft, the roller presses the inner surface in the circumferential direction of the claw section in the rotational direction of the rotational shaft.

6. The belt type continuously variable transmission device according to claim 1, further comprising
   an urging force generation member provided between the gear case and the moveable feed member and that urges the moveable feed member toward the one-side pulley.

7. The belt type continuously variable transmission device according to claim 1, further comprising
   a fixed stay that fixes the gear case on a separate member, and that is placed, on the belt bridged over a drive pulley and a driven pulley, to penetrate through a space that becomes a belt inside region in all setting states of a belt position.

8. The belt type continuously variable transmission device according to claim 1, wherein
when the one-side pulley and the other-side pulley are viewed in the axial direction, the electric motor is placed in a rectangular region formed by a first straight line and a second straight line connecting maximum inscribed circles on the outer circumferential surfaces of the pulleys, a third straight line connecting one end of the first straight line and one end of the second straight line, and a fourth straight line connecting the other ends of the first straight line and the second straight line.

* * * * *